US008000178B2

(12) United States Patent
Shimazawa et al.

(10) Patent No.: US 8,000,178 B2
(45) Date of Patent: *Aug. 16, 2011

(54) NEAR-FIELD LIGHT GENERATING ELEMENT UTILIZING SURFACE PLASMON

(75) Inventors: Koji Shimazawa, Tokyo (JP); Eiji Komura, Tokyo (JP); Yasuhiro Ito, Tokyo (JP); Seiichi Takayama, Tokyo (JP); Satoshi Tomikawa, Tokyo (JP); Daisuke Miyauchi, Tokyo (JP); Kosuke Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 134 days.

This patent is subject to a terminal disclaimer.

(21) Appl. No.: 12/260,639

(22) Filed: Oct. 29, 2008

(65) Prior Publication Data
US 2010/0103553 A1  Apr. 29, 2010

(51) Int. Cl.
*G11B 11/00* (2006.01)
(52) U.S. Cl. .............. 369/13.33; 369/13.13; 360/59
(58) Field of Classification Search .......... 360/59; 369/13.33, 13.13, 13.32; 385/31, 88–94, 385/129; 250/201.3, 201.5
See application file for complete search history.

(56) References Cited

U.S. PATENT DOCUMENTS

| 6,768,556 | B1 | 7/2004 | Matsumoto et al. | |
|---|---|---|---|---|
| 7,330,404 | B2 | 2/2008 | Peng et al. | |
| 7,518,815 | B2* | 4/2009 | Rottmayer et al. | 360/59 |
| 7,911,882 | B2 | 3/2011 | Shimazawa et al. | |
| 2003/0066944 | A1 | 4/2003 | Matsumoto et al. | |
| 2003/0128633 | A1* | 7/2003 | Batra et al. | 369/13.32 |
| 2004/0081031 | A1 | 4/2004 | Saga et al. | |
| 2005/0157393 | A1* | 7/2005 | Hasegawa et al. | 359/586 |
| 2005/0249451 | A1 | 11/2005 | Baehr-Jones et al. | |
| 2007/0041119 | A1* | 2/2007 | Matsumoto et al. | 360/59 |
| 2007/0286031 | A1* | 12/2007 | Matsumoto | 369/13.13 |
| 2009/0059411 | A1* | 3/2009 | Tanaka et al. | 360/59 |
| 2010/0046331 | A1* | 2/2010 | Takayama et al. | 369/13.33 |

(Continued)

FOREIGN PATENT DOCUMENTS

JP  2005-004901  1/2005

(Continued)

OTHER PUBLICATIONS

Michael Hochberg, et al., "Integrated plasmon and dielectric waveguides", Optics Express vol. 12, No. 22, Nov. 2004, pp. 5481-5486.

(Continued)

*Primary Examiner* — Tan X Dinh
(74) *Attorney, Agent, or Firm* — Frommer Lawrence & Haug LLP

(57) ABSTRACT

Provided is a surface plasmon antenna that can be set so that the emitting position on the end surface of the plasmon antenna where near-field light is emitted is located sufficiently close to the end of a magnetic pole. The surface plasmon antenna comprises an edge having a portion for coupling with a light in a surface plasmon mode. The edge is provided for propagating surface plasmon excited by the light and extends from the portion to a near-field light generating end surface that emits near-field light. The edge for propagating surface plasmon is a very narrow propagation region. Therefore, the near-field light generating end surface, which appears as a polished surface processed through polishing in the manufacturing of the plasmon antenna, can be made a shape with a very small size, and further can be set so that surface plasmon propagates to reach the end surface reliably.

25 Claims, 11 Drawing Sheets

U.S. PATENT DOCUMENTS

| | | | |
|---|---|---|---|
| 2010/0061200 A1* | 3/2010 | Shimazawa et al. | 369/13.33 |
| 2010/0073802 A1* | 3/2010 | Komura et al. | 360/59 |
| 2010/0073803 A1* | 3/2010 | Sekine et al. | 360/59 |
| 2010/0079895 A1* | 4/2010 | Takayama et al. | 360/59 |
| 2010/0118431 A1* | 5/2010 | Tomikawa et al. | 360/59 |

FOREIGN PATENT DOCUMENTS

| | | |
|---|---|---|
| JP | 2005-116155 | 4/2005 |
| JP | 2006-004577 | 1/2006 |
| JP | 2006-053978 | 2/2006 |
| JP | 2007-164935 | 6/2007 |
| JP | 2007-193906 | 8/2007 |
| JP | 2008-111845 | 5/2008 |
| JP | 2008-152897 | 7/2008 |
| JP | 2008-257819 | 10/2008 |

OTHER PUBLICATIONS

U.S. Appl. No. 12/205,484. filed Sep. 5, 2008 by Koji Shimazawa, et al.

* cited by examiner

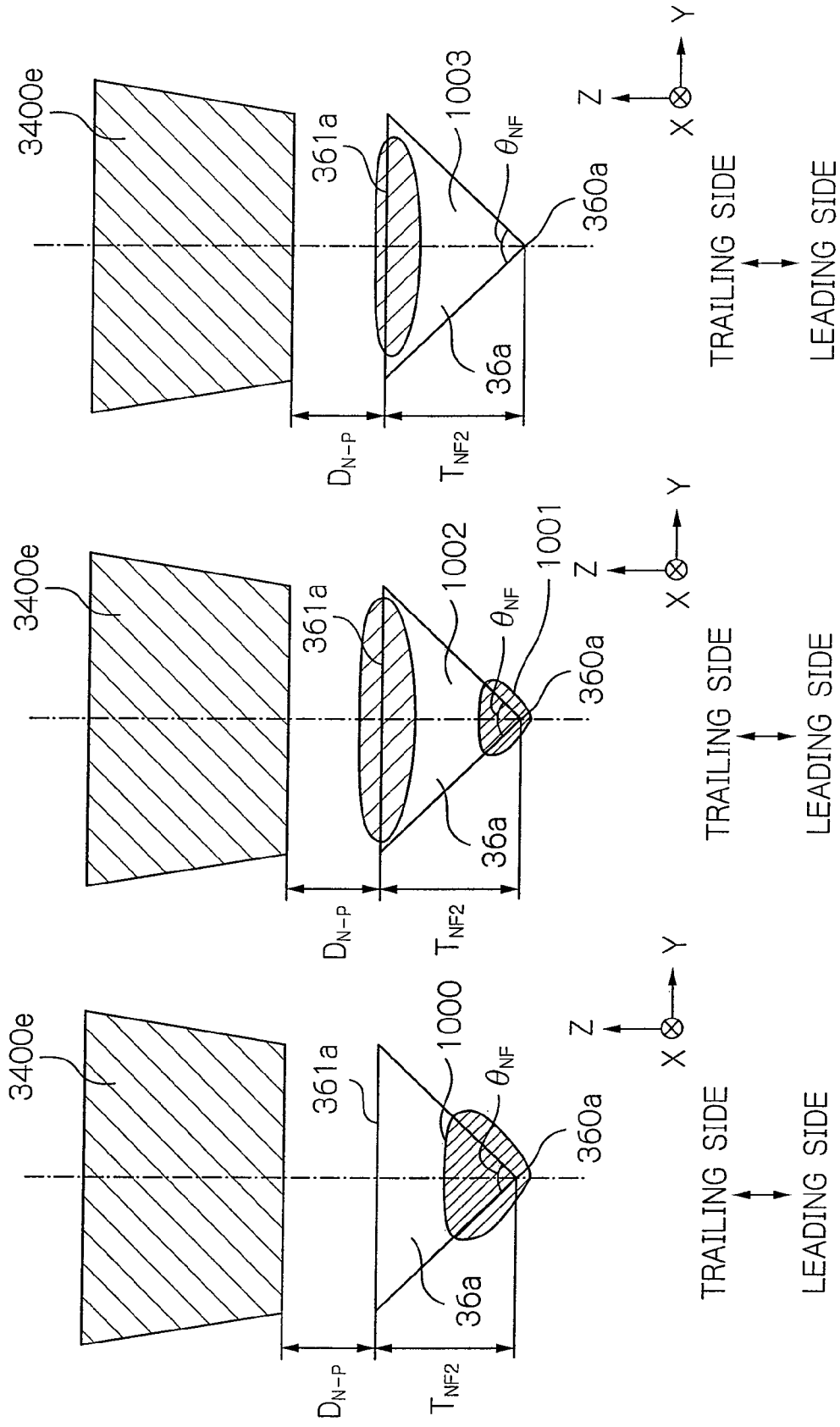

NEAR-FIELD LIGHT GENERATING ELEMENT UTILIZING SURFACE PLASMON

BACKGROUND OF THE INVENTION

1. Field of the Invention

The present invention relates to a plasmon antenna for generating near-field light by being irradiated with light.

And the present invention relates to a head used for thermal-assisted magnetic recording in which a magnetic recording medium is irradiated with near-field light, thereby anisotropic magnetic field of the medium is lowered, thus data can be written. Further, the present invention relates to a magnetic recording apparatus provided with the head.

2. Description of the Related Art

As the recording density of a magnetic disk apparatus becomes higher, further improvement has been required in the performance of a thin-film magnetic head and a magnetic recording medium. As the thin-film magnetic head, a composite-type thin-film magnetic head is widely used, which has a stacked structure of a magnetoresistive (MR) element for reading data and an electromagnetic transducer for writing data.

Whereas, the magnetic recording medium is generally a kind of discontinuous body of magnetic microparticles gathered together, and each of the magnetic microparticles has a single magnetic domain structure. Here, one record bit consists of a plurality of the magnetic microparticles. Therefore, in order to improve the recording density, it is necessary to decrease the size of the magnetic microparticles and reduce irregularity in the boundary of the record bit. However, the decrease in size of the magnetic microparticles raises a problem of degradation in thermal stability of the magnetization due to the decrease in volume.

As a measure against the thermal stability problem, it may be possible to increase the magnetic anisotropy energy $K_U$ of the magnetic microparticles. However, the increase in energy $K_U$ causes the increase in anisotropic magnetic field (coercive force) of the magnetic recording medium. Whereas, write field intensity of the thin-film magnetic head is limited by the amount of saturation magnetic flux density of the soft-magnetic material of which the magnetic core of the head is formed. Therefore, the head cannot write data to the magnetic recording medium when the anisotropic magnetic field (coercive force) of the medium exceeds the write field limit. Recently, as a method for solving this problem of thermal stability, so-called a thermal-assisted magnetic recording technique is proposed, in which writing is performed by reducing the anisotropic magnetic field with heat supplied to the magnetic recording medium formed of a magnetic material with a large $K_U$ just before applying write field.

As a thermal-assisted magnetic recording technique, a method has been generally known, in which a near-field light probe formed of a metal piece, so-called a plasmon antenna, is used for generating near-field light from plasmon that is excited by irradiated laser light. For example, U.S. Pat. No. 6,768,556 B1 discloses a plasmon antenna that includes a metal scatterer with a strobilus shape formed on a substrate and a dielectric material film formed around the metal scatterer. And US Patent Publication No. 2004/081031 A1 discloses a configuration in which a plasmon antenna is formed in contact with the main magnetic pole of a magnetic head for perpendicular magnetic recording in such a way that the irradiated surface of the plasmon antenna is perpendicular to the surface of a magnetic recording medium. Further, US Patent Publication No. 2003/066944 A1 discloses a technique in which the tip of a plasmon antenna is made closer to a magnetic recording medium to attempt to irradiate the medium with stronger near-field light.

However, when such a plasmon antenna is used as a near-field light generating part to implement thermal-assisted magnetic recording, a difficult problem can arise as described below.

While a plasmon antenna converts applied laser light to near-field light as described above, it is known that the light use efficiency is approximately 10% at the highest. Most part of the applied laser light, excluding the light reflected by the surface of the plasmon antenna, changes to thermal energy in the plasmon antenna. The size of the plasmon antenna is set to a value less than or equal to the wavelength of laser light, and its volume is very small. Accordingly, the thermal energy heats the plasmon antenna to an extremely high temperature. For example, a simulation shows that, when a plasmon antenna made of Au that is a 50-nm-thick equilateral-triangular plate with each edge of 300 nm (nanometers) absorbs laser light of 17 mW at room temperature, the temperature of the plasmon antenna reaches 500° C. (degrees Celsius).

Such temperature rise causes the plasmon antenna to thermally expand and protrude from the opposed-to-medium surface toward a magnetic recording medium. As a result, the end, which reaches the opposed-to-medium surface, of a read head element for reading data signal or servo signal from the magnetic recording medium can become relatively far apart from the magnetic recording medium. If this is the case, it will be difficult to properly read the servo signal during writing in which the plasmon antenna is used to irradiate the magnetic recording medium with near-field light. In addition, the electrical resistance of the plasmon antenna increases to a considerably high value at such extremely high temperature. This means that the light use efficiency of the plasmon antenna described above can be further degraded because of increased thermal disturbance of free electrons in the plasmon antenna.

To solve the problem, the present inventors have devised a near-field light generating element in which laser light propagating through a waveguide is coupled with a plasmon antenna in a surface plasmon mode to cause the excited surface plasmon to propagate to the opposed-to-medium-surface, thereby providing near-field light, rather than directly applying the laser light to a plasmon antenna. The plasmon antenna in the element will be hereinafter referred to as a surface plasmon antenna. In the near-field light generating element, the temperature of the surface plasmon antenna does not excessively rise because laser light is not directly applied to the surface plasmon antenna. Further, the portion in which laser light is coupled with the surface plasmon antenna in the surface plasmon mode is provided on the side opposite to a magnetic pole for generating write field for writing data to prevent laser light from being absorbed into the magnetic pole, thereby ensuring a certain amount of light to be applied to the surface plasmon antenna.

To perform thermal-assisted magnetic recording in practice by using the above-described near-field light generating element, the end of the surface plasmon antenna needs to be located as close to the magnetic pole end as possible in the opposed-to-medium surface. In particular, the distance between them in the direction along track is preferably set to 100 nm or less. Such a distance can provide a sufficiently large field gradient of write field generated from the magnetic pole in a position on the magnetic recording medium where near-field light is applied.

For the same reason, the emitting position on the end surface of the surface plasmon antenna where near-field light is emitted needs to be located as close to the magnetic pole as possible. To meet the requirement, it may be contemplated to make a portion of the surface plasmon antenna that is near the opposed-to-medium surface ultrathin. To make the portion near the opposed-to-medium surface ultrathin, however, an extremely high polishing accuracy must be achieved in the polishing process for forming the opposed-to-medium surface during manufacturing of the head. Therefore, this approach is difficult to implement. On the other hand, it may be also contemplated that, instead of increasing the accuracy of polishing, the angle of inclination of a propagation surface of the surface plasmon antenna in which surface plasmon propagates is reduced so that the portion near the opposed-to-medium surface is made ultrathin after polishing. However, in this case, the distance by which surface plasmon propagates increases and so does the amount of energy absorbed into the surface plasmon antenna, increasing propagation loss.

SUMMARY OF THE INVENTION

Therefore, an object of the present invention is to provide a surface plasmon antenna that can be set so that the emitting position on the end surface of the surface plasmon antenna where near-field light is emitted is located sufficiently close to the end of a magnetic pole, and is to provide a near-field light generating element provided with the surface plasmon antenna.

Another object of the present invention is to provide a thermal-assisted magnetic recording head capable of appropriately heating the write position on the magnetic recording medium, to provide a head gimbal assembly (HGA) provided with the head, and further, to provide a magnetic recording apparatus provided with the HGA. Furthermore, another object of the present invention is to provide a near-field light generating element capable of avoiding excessive temperature rise.

Some terms used in the specification will be defined before explaining the present invention. In a layered structure or an element structure formed on an element-formation surface of a slider substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z direction corresponds to a trailing side and −Z direction to a leading side. And Y-axis direction indicates a track width direction, and X-axis direction indicates a height direction.

Further, a "side surface" of a waveguide provided within the magnetic recording head is defined as an end surface other than the end surfaces perpendicular to the direction in which light propagates within the waveguide (−X direction), out of all the end surfaces surrounding the waveguide. According to the definition, an "upper surface" and a "lower surface" are one of the "side surfaces". The "side surface" is a surface on which the propagating light can be totally reflected within the waveguide corresponding to a core.

According to the present invention, a plasmon antenna is provided, which comprises an edge having a portion for coupling with a light in a surface plasmon mode, the edge being provided for propagating surface plasmon excited by the light, and extending from the portion to a near-field light generating end surface that emits near-field light.

In the above-described plasmon antenna, the edge for propagating surface plasmon is a very narrow propagation region. Therefore, the near-field light generating end surface, which appears as a polished surface processed through polishing in the manufacturing of the plasmon antenna, can be made a shape with a very small size, and further can be set so that surface plasmon propagates to reach the near-field light generating end surface reliably. Further, by adjusting the shape and size of the near-field light generating end surface, the emitting position of near-field light on the end surface can be controlled.

According to the present invention, a near-field light generating element is further provided, which comprises:

a waveguide through which a light for exciting surface plasmon propagates; and a plasmon antenna comprising an edge having a portion for coupling with the light in a surface plasmon mode, the portion being opposed to a portion of a side surface of the waveguide with a predetermined spacing, and the edge being provided for propagating surface plasmon excited by the light, and extending from the portion to a near-field light generating end surface that emits near-field light.

Furthermore, according to the present invention, a thermal-assisted magnetic recording head is provided, which comprises:

a magnetic pole for generating write field from its end on an opposed-to-medium surface side;

a waveguide through which a light for exciting surface plasmon propagates; and a plasmon antenna comprising an edge having a portion for coupling with the light in a surface plasmon mode, the portion being opposed to a portion of a side surface of the waveguide with a predetermined spacing, and the edge being provided for propagating surface plasmon excited by the light, and extending from the portion to a near-field light generating end surface that reaches an opposed-to-medium surface and emits near-field light.

In the above-described thermal-assisted magnetic recording head, by adjusting the shape and size of the near-field light generating end surface, the emitting position of near-field light on the end surface can be set to be closer to the magnetic pole. As a result, write field with sufficiently large gradient can be applied to a sufficiently heated portion of the magnetic recording layer of the magnetic recording medium. This enables a stable thermal-assisted write operation to be reliably achieved.

In the thermal-assisted magnetic recording head according to the present invention, the waveguide is preferably provided in a side opposite to the magnetic pole in relation to the plasmon antenna. In this case, a portion on the opposed-to-medium surface side of the plasmon antenna is preferably inclined so as to become closer to an end portion on the opposed-to-medium surface side of the magnetic pole toward the opposed-to-medium surface. Alternatively, a portion on the opposed-to-medium surface side of the magnetic pole is preferably inclined so as to become closer to an end portion on the opposed-to-medium surface side of the plasmon antenna toward the opposed-to-medium surface. Further in the inclined magnetic pole portion case, it is also preferable that a portion on the opposed-to-medium surface side of an end surface of the plasmon antenna, the end surface being on a side opposite to the edge, is inclined so as to become closer to the edge toward the opposed-to-medium surface.

Further, in the thermal-assisted magnetic recording head according to the present invention, at least a portion of the edge preferably extends so as to become closer to an end surface of the plasmon antenna toward the near-field light generating end surface, the end surface being on a side opposite to the edge. Further in the case, it is also preferable that a portion of the edge near the near-field light generating end surface extends parallel to the end surface opposite to the edge of the plasmon antenna.

Further, in the thermal-assisted magnetic recording head according to the present invention, the near-field light generating end surface of the plasmon antenna preferably has a triangular shape in which one apex is an end of the edge. In the case, the near-field light generating end surface preferably has a triangular shape with a height of 30 nm (nanometers) or less, and more preferably with a height of 20 nm or less. And the distance between the near-field light generating end surface of the plasmon antenna and an end surface of the magnetic pole on the opposed-to-medium surface is at least 20 nm, and more preferably at least 30 nm. These conditions enable the emitting position of near-field light on the near-field light end surface to be set to be closer to the end surface of the magnetic pole. As a result, write field with sufficiently large gradient can be more reliably applied to a sufficiently heated portion of the magnetic recording medium. Here, it is also preferable that the near-field light generating end surface of the plasmon antenna has a shape of a rhombus in which one apex is an end of the edge.

Further, in the thermal-assisted magnetic recording head according to the present invention, the plasmon antenna is preferably formed of one element selected from a group of Pd, Pt, Rh, Ir, Ru, Au, Ag, Cu or Al, or an alloy made of at least two selected from the group. And it is preferable that a portion sandwiched between the portion of the side surface of the waveguide and the portion of the edge, which are opposed to each other, is a buffering portion having a refractive index lower than a refractive index of the waveguide. In this case, the buffering portion is preferably a portion of an overcoat layer formed so as to cover the waveguide.

Further, the edge provided in the plasmon antenna is preferably covered with a material having a refractive index higher than a refractive index of a material covering an end surface of the plasmon antenna, the end surface being on a side opposite to the edge. In this case, a thermal conduction layer is preferably provided between the plasmon antenna and the magnetic pole, so as to cover the end surface opposite to the edge of the plasmon antenna.

Further, according to the present invention, a head gimbal assembly (HGA) is provided, which comprises a thermal-assisted magnetic recording head described above and a suspension supporting the thermal-assisted magnetic recording head.

Furthermore, according to the present invention, a magnetic recording apparatus is provided, which comprises at least one HGA comprising a thermal-assisted magnetic recording head and a suspension supporting the thermal-assisted magnetic recording head;

at least one magnetic recording medium; and a recording circuit for controlling write operations which the thermal-assisted magnetic recording head performs to the at least one magnetic recording medium, the thermal-assisted magnetic recording head comprising:

a magnetic pole for generating write field from its end on an opposed-to-medium surface side;

a waveguide through which a light for exciting surface plasmon propagates; and a plasmon antenna comprising an edge having a portion for coupling with the light in a surface plasmon mode, the portion being opposed to a portion of a side surface of the waveguide with a predetermined spacing, and the edge being provided for propagating surface plasmon excited by the light, and extending from the portion to a near-field light generating end surface that reaches an opposed-to-medium surface and emits near-field light, and the recording circuit further comprising a light-emission control circuit for controlling operations of a light source that generates the light for exciting surface plasmon.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIG. 10a shows a case where the emitting position of near-field light is in a "leading side state";

FIG. 10b shows a case where the emitting position of near-field light is in an "intermediate state"; and FIG. 10c shows a case where the emitting position of near-field light is in a "trailing side state".

DESCRIPTION OF THE PREFERRED EMBODIMENTS

Figure 1:
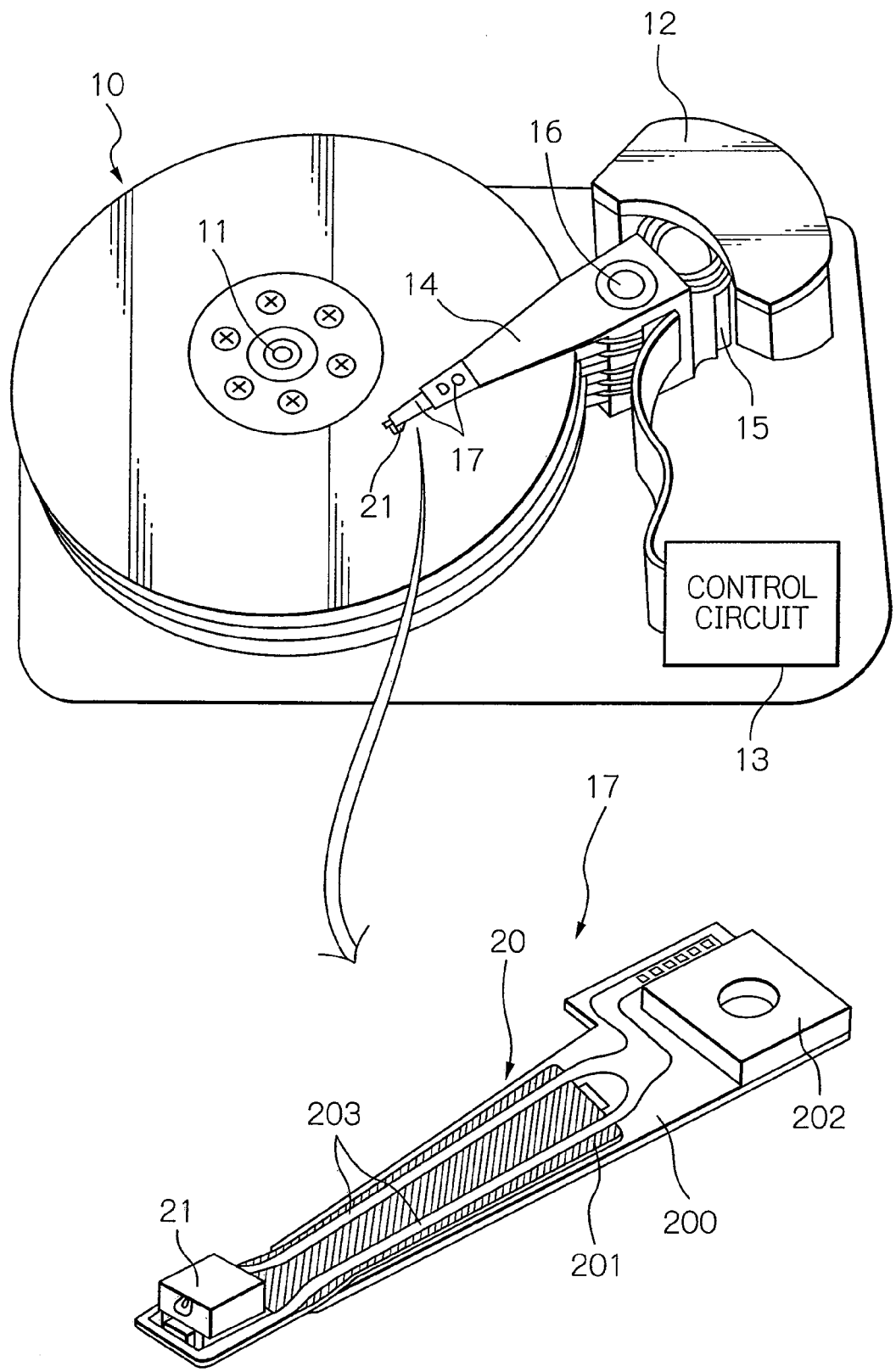
FIG. 1 shows a perspective view schematically illustrating a structure of a major part in one embodiment of a magnetic recording apparatus and an HGA according to the present invention.

FIG. 1 shows a perspective view schematically illustrating a structure of a major part in one embodiment of a magnetic recording apparatus and an HGA according to the present invention. Here, in the perspective view of the HGA, the side of the HGA, opposed to the surface of the magnetic recording medium, is presented as the upper side.

A magnetic disk apparatus as a magnetic recording apparatus shown in FIG. 1 includes: a plurality of magnetic disks 10 as magnetic recording media, rotating around a rotational axis of a spindle motor 11; an assembly carriage device 12 provided with a plurality of drive arms 14 thereon; a head gimbal assembly (HGA) 17 attached on the top end portion of each drive arm 14 and provided with a thermal-assisted magnetic recording head 21 as a thin-film magnetic head; and a recording/reproducing and light-emission control circuit 13 for controlling write/read operations of the thermal-assisted magnetic recording head 21 and further for controlling the emission operation of a laser diode as a light source that generates laser light for thermal-assisted magnetic recording, which will be described later.

In the present embodiment, the magnetic disk 10 is designed for perpendicular magnetic recording, and has a structure in which sequentially stacked on a disk substrate is: a soft-magnetic under layer; an intermediate layer; and a magnetic recording layer (perpendicular magnetization layer). The assembly carriage device 12 is a device for positioning the thermal-assisted magnetic recording head 21 above a track formed on the magnetic recording layer of the magnetic disk 10, on which recording bits are aligned. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and thermal-assisted magnetic recording heads 21 may be one.

Referring also to FIG. 1, a suspension 20 in the HGA 17 includes a load beam 200, a flexure 201 with elasticity fixed to the load beam 200, and a base plate 202 provided on the base portion of the load beam 200. Further, on the flexure 201, there is provided a wiring member 203 that is made up of lead conductors and connection pads electrically joined to both ends of the lead conductors. The thermal-assisted magnetic recording head 21 is fixed to the flexure 201 at the top end portion of the suspension 20 so as to face the surface of each magnetic disk 10 with a predetermined spacing (flying height). Moreover, one ends of the wiring member 203 are electrically connected to terminal electrodes of the thermal-assisted magnetic recording head 21.

The structure of the suspension 20 is not limited to the above-described one. An IC chip for driving the head may be mounted midway on the suspension 20, though not shown.

Figure 2:
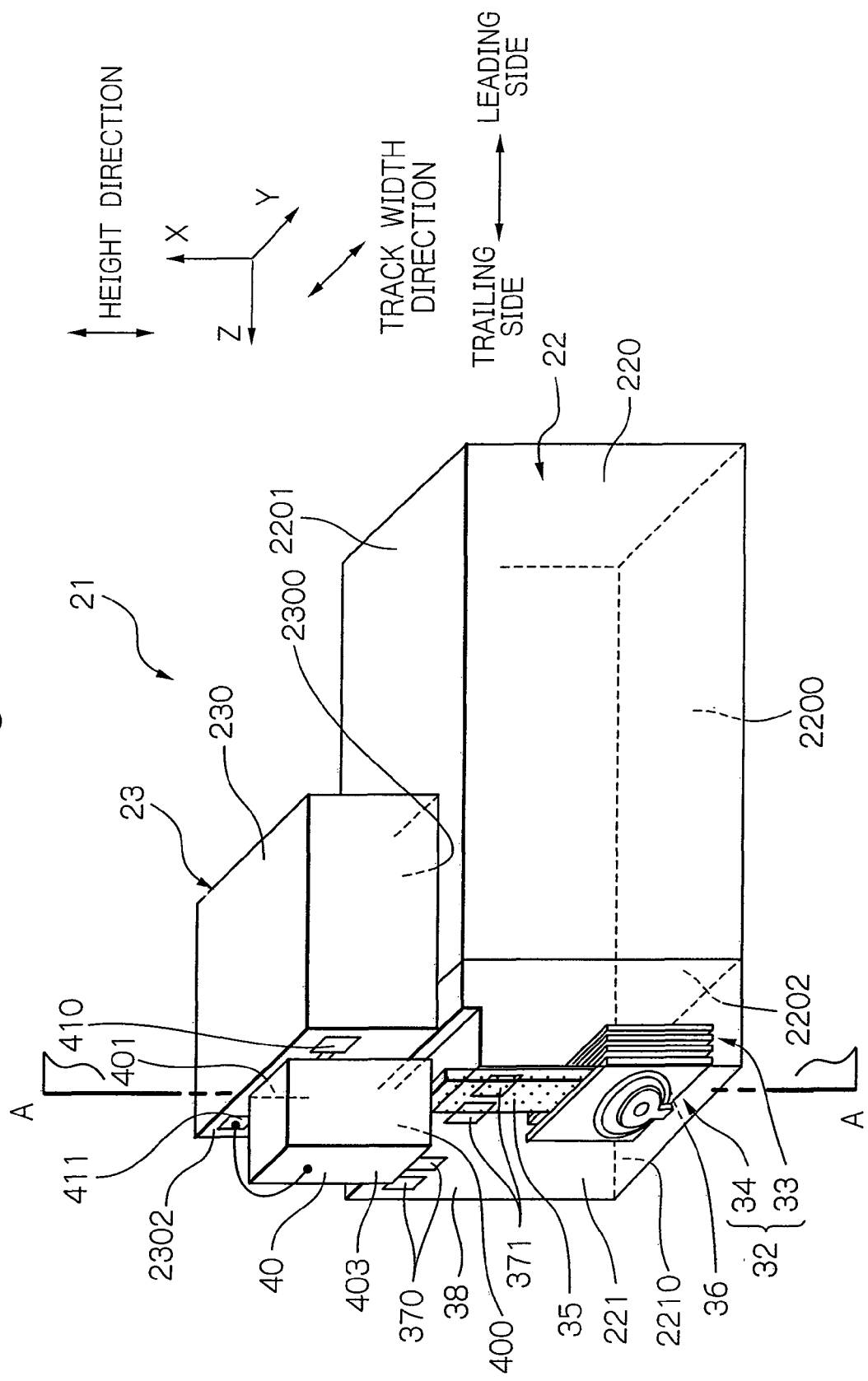
FIG. 2 shows a perspective view illustrating one embodiment of thermal-assisted magnetic recording head according to the present invention.

FIG. 2 shows a perspective view illustrating one embodiment of thermal-assisted magnetic recording head 21 according to the present invention.

As shown in FIG. 2, a thermal-assisted magnetic recording head 21 is constituted of the slider 22 and the light source unit 23. The slider 22 includes: a slider substrate 220 formed of, for example, AlTiC ($Al_2O_3$—TiC), and having an air bearing surface (ABS) 2200 processed so as to provide an appropriate flying height; and a head part 221 formed on an element-formation surface 2202 perpendicular to the ABS 2200. While, the light source unit 23 includes: a unit substrate 230 formed of, for example, AlTiC ($Al_2O_3$—TiC), and having an joining surface 2300; and a laser diode 40 as a light source provided on a source-installation surface 2302 perpendicular to the joining surface 2300. The slider 22 and the light source unit 23 are bonded to each other so that the back surface 2201 of the slider substrate 220 and the joining surface 2300 of the unit substrate 230 have a surface contact with each other. Here, the back surface 2201 of the slider substrate 220 is defined as an end surface opposite to the ABS 2200 of the slider substrate 220. Alternatively, the thermal-assisted magnetic recording head 21 may have a configuration in which the laser diode 40 is provided directly on the slider 22 without using the light source unit 23.

In the slider 22, the head part 221 formed on the element-formation surface 2202 of the slider substrate 220 includes: a head element 32 constituted of a magnetoresistive (MR) element 33 for reading data from the magnetic disk and an electromagnetic transducer 34 for writing data to the magnetic disk; a waveguide 35 for guiding laser light generated from a laser diode 40 provided in the light source unit 23 to the opposed-to-medium surface side; a surface plasmon antenna 36 which, together with the waveguide 35, constitutes a near-field light generating element; an overcoat layer 38 formed on the element-formation surface 2202, so as to cover the MR element 33, the electromagnetic transducer 34, the waveguide 35, and the surface plasmon antenna 36; a pair of terminal electrodes 370 exposed in the upper surface of the overcoat layer 38 and electrically connected to the MR element 33; and a pair of terminal electrodes 371 also exposed in the upper surface of the overcoat layer 38 and electrically connected to the electromagnetic transducer 34. The terminal electrodes 370 and 371 are electrically connected to the connection pads of the wiring member 203 provided on the flexure 201 (FIG. 1).

One ends of the MR element 33, the electromagnetic transducer 34, and the surface plasmon antenna 36 reach the head part end surface 2210, which is an opposed-to-medium surface of the head part 221. Here, the head part end surface 2210 and the ABS 2200 constitute the whole opposed-to-medium surface of the thermal-assisted magnetic recording head 21. During actual write and read operations, the thermal-assisted magnetic recording head 21 aerodynamically flies above the surface of the rotating magnetic disk with a predetermined flying height. Thus, the ends of the MR element 33 and electromagnetic transducer 34 face the surface of the magnetic recording layer of the magnetic disk with an appropriate magnetic spacing. Then, the MR element 33 reads data by sensing signal magnetic field from the magnetic recording layer, and the electromagnetic transducer 34 writes data by applying signal magnetic field to the magnetic recording layer. When writing data, laser light is generated from the laser diode 40 of the light source unit 23 and propagates through the waveguide 35. Then, the laser light is coupled with the surface plasmon antenna 36 in a surface plasmon mode, and causes surface plasmon to be excited on the surface plasmon antenna 36. The surface plasmon propagates on a propagation edge provided in the surface plasmon antenna 36, which will be detailed later, toward the head part end surface 2210, which causes near-field light to be generated from the end on the head part end surface 2210 side of the surface plasmon antenna 36. The generated near-field light reaches the surface of the magnetic disk, and heats a portion of the magnetic recording layer of the magnetic disk. As a result, the anisotropic magnetic field (coercive force) of the portion is decreased to a value that enables writing; thus the thermal-assisted magnetic recording can be accomplished.

Figure 3:
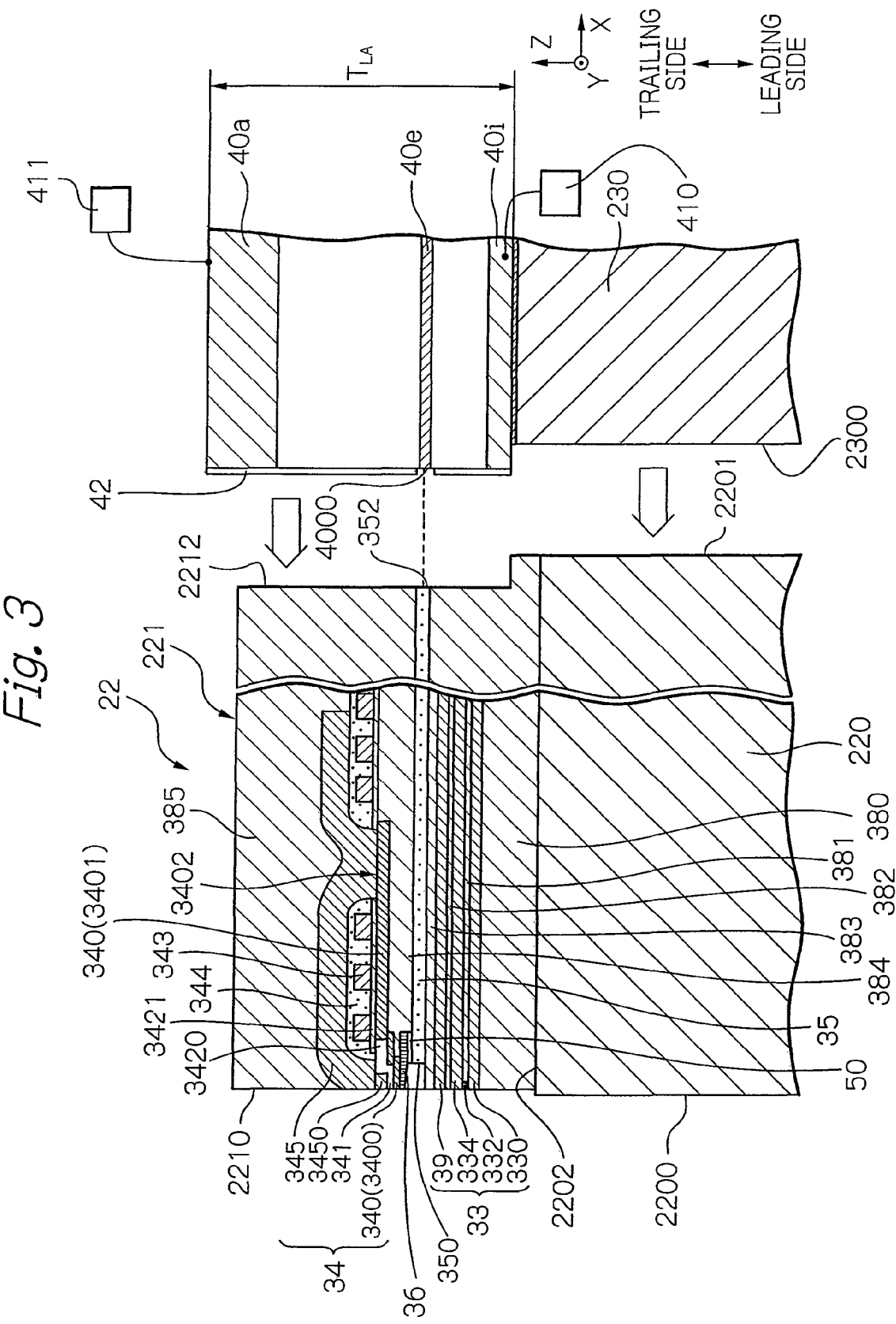
FIG. 3 shows a cross-sectional view taken by plane A in FIG. 2, schematically illustrating a main part of the thermal-assisted magnetic recording head.

FIG. 3 shows a cross-sectional view taken by plane A in FIG. 2, schematically illustrating a main part of the thermal-assisted magnetic recording head 21.

As shown in FIG. 3, the MR element 33 is formed on the insulating layer 380 stacked on the element-formation surface 2202, and includes: an MR multilayer 332; and a lower shield layer 330 and an upper shield layer 334 which sandwich the MR multilayer 332 and the insulating layer 381 therebetween. The upper and lower shield layers 334 and 330 prevent the MR multilayer 332 from receiving external magnetic field as a noise. The upper and lower shield layers 334 and 330 are magnetic layers formed of soft-magnetic materials such as NiFe (Permalloy), FeSiAl (Sendust), CoFeNi, CoFe, FeN, FeZrN or CoZrTaCr, or the multilayer of at least two of these materials, with thickness of approximately 0.5 to 3 µm, by using a frame plating method or a sputtering method.

The MR multilayer 332 is a magneto-sensitive part for detecting signal magnetic field by using MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes. Whereas, in the case that the MR multilayer 332 is a CIP-GMR multilayer, insulating layers are provided between the MR multilayer 332 and respective upper and lower shield layers 334 and 330; further, formed are MR lead layers that is electrically connected to the MR multilayer 332.

In the case of TMR multilayer, for example, the MR multilayer 332 may have a stacked structure in which sequentially stacked are: an antiferromagnetic layer made of, for example, IrMn, PtMn, NiMn or RuRhMn, with thickness of approximately 5 to 15 nm; a magnetization-direction-fixed layer (pinned layer) in which two ferromagnetic layers such as CoFe sandwich a non-magnetic metal layer such as Ru therebetween, and the direction of the magnetization is fixed by the antiferromagnetic layer; a tunnel barrier layer made of a non-magnetic dielectric material obtained by the process that a metal film such as Al or AlCu, for example, with thickness of approximately 0.5 to 1 nm is oxidized by oxygen introduced into the vacuum equipment, or is naturally oxidized; and a magnetization-direction-free layer (free layer) having a double-layered structure of a ferromagnetic material such as CoFe, for example, with thickness of approximately 1 nm and a ferromagnetic material such as NiFe, for example, with thickness of approximately 3 to 4 nm, which has a tunnel exchange interaction with the pinned layer through the tunnel barrier layer.

Also as shown in FIG. 3, the electromagnetic transducer 34 is designed for perpendicular magnetic recording, and includes a main magnetic pole layer 340, a gap layer 341, a write coil layer 343, a coil insulating layer 344, and a write shield layer 345.

The main magnetic pole layer 340 is provided on an insulating layer 384 made of an insulating material such as $Al_2O_3$ (alumina), and acts as a magnetic path for converging and guiding a magnetic flux toward the magnetic recording layer (perpendicular magnetization layer) of the magnetic disk, the magnetic flux being excited by write current flowing through the write coil layer 343. The main magnetic pole layer 340 has a structure in which a main magnetic pole 3400 and a main pole body 3401 are sequentially stacked. The main magnetic pole 3400 includes: a first main pole portion 3400a having a small width $W_P$ (FIG. 5) in the track width direction; and a second main pole portion 3400b located on the first main pole portion 3400a and at the rear (+X side) of the portion 3400a. The small width $W_P$ of the first main pole portion 3400a enables a fine write magnetic field to be generated, so that the track width can be set to be a very small value adequate for higher recording density. The main magnetic pole 3400 is formed of a soft-magnetic material with saturation magnetic flux density higher than that of the main pole body 3401, which is, for example, an iron alloy containing Fe as a main component, such as FeNi, FeCo, FeCoNi, FeN or FeZrN. The thickness of the first main pole portion 3400a is, for example, in the range of approximately 0.1 to 0.8 μm.

The gap layer 341 forms a gap provided for separating the main magnetic pole layer 340 from the write shield layer 345 in the region near the head part end surface. The gap layer 341 is formed, for example, of a non-magnetic insulating material such as $Al_2O_3$ (alumina), $SiO_2$ (silicon dioxide), AlN (aluminum nitride) or DLC, or formed of a non-magnetic conductive material such as Ru (ruthenium). The thickness of the gap layer 341 determines the spacing between the main magnetic pole layer 340 and the write shield layer 345, and is, for example, in the range of approximately 0.01 to 0.5 μm.

The write coil layer 343 is formed on a insulating layer 3421 made of an insulating material such as $Al_2O_3$ (alumina), in such a way to pass through in one turn at least between the main magnetic pole layer 340 and the write shield layer 345, and has a spiral structure with a back contact portion 3402 as a center. The write coil layer 343 is formed of a conductive material such as Cu (copper). The write coil layer 343 is covered with a coil insulating layer 344 that is formed of an insulating material such as a heat-cured photoresist and electrically isolates the write coil layer 343 from the main magnetic pole layer 340 and the write shield layer 345. The write coil layer 343 has a monolayer structure in the present embodiment, however, may have a two or more layered structure or a helical coil shape. Further, the number of turns of the write coil layer 343 is not limited to that shown in FIG. 3, and may be, for example, in the range from two to seven.

The write shield layer 345 reaches the head part end surface 2210, and acts as a magnetic path for the magnetic flux returning from a soft-magnetic under layer that is provided under the magnetic recording layer (perpendicular magnetization layer) of the magnetic disk. The thickness of the write shield layer 345 is, for example, approximately 0.5 to 5 Mm. Further, the write shield layer 345 has a trailing shield 3450 that is a portion opposed to the main magnetic pole layer 340. The trailing shield 3450 also extends to the head part end surface 2210, and is provided for receiving the magnetic flux spreading from the main magnetic pole layer 340. In the present embodiment, the trailing shield 3450 is planarized together with an insulating layer 3420 and the main pole body 3401, and has a width in the track width direction larger than the width of the main pole body 3401 as well as the first main pole portion 3400a. This trailing shield 3450 causes the magnetic field gradient between the end portion of the trailing shield 3450 and the first main pole portion 3400a to become steeper. As a result, a jitter of signal output becomes smaller, and therefore, error rates during read operation can be reduced. The write shield layer 345 is formed of a soft-magnetic material; especially, the trailing shield 3450 is formed of a material with high saturation magnetic flux density such as NiFe (Permalloy) or formed of an iron alloy as the main magnetic pole 3400 is formed of.

Referring also to FIG. 3, the waveguide 35 and the surface plasmon antenna 36 are provided between the MR element 33 and the electromagnetic transducer 34, and constitute an optical system within the head part 221. Here, the waveguide 35 is arranged in parallel with the element-formation surface 2202, and extends from an end surface 352 reaching the head part end surface 2212 to an end surface 350 on the head part end surface 2210 side. A portion of the upper surface (side surface) of the waveguide 35 faces a portion of the lower surface (including a propagation edge 360 (FIG. 4)) of the surface plasmon antenna 36 with a predetermined spacing, and the sandwiched portion between these portions constitutes a buffering portion 50 having a refractive index lower than that of the waveguide 35. The buffering portion 50 acts for coupling the laser light that propagates through the waveguide 35 with the surface plasmon antenna 36 in the surface plasmon mode. Here, the buffering portion 50 may be a portion of an insulating layer 384 that is a part of the overcoat layer 38, or a new layer provided other than the insulating layer 384. A detailed description of the waveguide 35, the surface plasmon antenna 36, and the buffering portion 50 will be given later with reference to FIG. 4.

Further, in the present embodiment, an inter-element shield layer 39 is provided between the MR element 33 and the electromagnetic transducer 34 (waveguide 35), sandwiched by the insulating layers 382 and 383. The inter-element shield layer 39 plays a role for shielding the MR element 33 from the magnetic field generated from the electromagnetic transducer 34, and may be formed of the same soft-magnetic material as the upper and lower shield layers 334 and 330. The inter-element shield layer 39 is not indispensable: the embodiment without the inter-element shield layer could be in the scope of the present invention. Further, a backing coil portion may be provided between the inter-element shield layer 39 and the waveguide 35. The backing coil portion is a coil portion for generating magnetic flux to negate a magnetic flux loop that is generated from the electromagnetic transducer 34 and passes through the upper and lower shield layers 334 and 330 of the MR element 33. Thus, the backing coil portion intends to suppress wide adjacent track erasure (WATE), that is, unwanted writing or erasing to the magnetic disk.

Also according to FIG. 3, a light source such as InP base, GaAs base or GaN base diode can be utilized as the laser diode 40, which is usually used for communication, optical disk storage or material analysis. The wavelength $\lambda_L$ of the radiated laser light may be, for example, in the range of approximately 375 nm to 1.7 µm (micrometer). Specifically, for example, a laser diode of InGaAsP/InP quaternary mixed crystal can also be used, in which possible wavelength region is set to be from 1.2 to 1.67 µm. The laser diode 40 has a multilayered structure including an upper-electrode 40a, an active layer 40e, and a lower-electrode 40i. On the front and rear cleaved surfaces of the multilayered structure of the laser diode 40, respectively formed are reflective layers made of, for example, $SiO_2$ or $Al_2O_3$ for exciting the oscillation by total reflection. Further, the reflective layer 42 has an opening in the position of the active layer 40e including the light-emission center 4000. Here, the laser diode 40 has, for example, a thickness $T_{LA}$ of approximately 60 to 200 µm.

Further, an electric source provided within the magnetic disk apparatus can be used for driving the laser diode 40. In fact, the magnetic disk apparatus usually has an electric source with applying voltage of, for example, approximately 2V, which is sufficient for the laser oscillation. The amount of electric power consumption of the laser diode 40 is, for example, in the order of several tens mW, which can be covered sufficiently by the electric source provided within the magnetic disk apparatus. In practice, a predetermined voltage is applied between the terminal electrode 410 connected electrically to the lower-electrode 40i and the terminal electrode 411 connected electrically to the upper-electrode 40a by using the electric source, to oscillate the laser diode 40. Then, laser light radiates from the opening including the emission center 4000 of the reflective layer 42.

The laser diode 40 and terminal electrodes 410 and 411 are not limited to the above-described embodiment. Further, alternatively, the thermal-assisted magnetic recording head 21 may include no laser diode 40; then, the light-emission center of a laser diode provided within the magnetic disk apparatus and the end surface 352 of the waveguide 35 may be connected by using optical fiber.

The light source unit 23 includes: the unit substrate 230; the laser diode 40 provided on the source-installation surface 2302 of the unit substrate 230; the terminal electrode 410 electrically connected to an electrode as the lower surface 401 of the laser diode 40; and the terminal electrode 411 electrically connected to an electrode as the upper surface 403 of the laser diode 40. The terminal electrodes 410 and 411 are electrically connected to the connection pads of the wiring member 203 provided on the flexure 201 (FIG. 1). By applying a predetermined voltage between both electrodes 410 and 411 of the laser diode 40, laser light is emitted from the emission center on an emission surface 400 of the laser diode 40. Here, in the configuration of the head as shown in FIG. 3, the oscillation of electric field component of the laser light generated from the laser diode 40 preferably has a direction perpendicular to the stacking surface of the active layer 40e (a Z-axis direction). That is, the laser diode 40 is preferably a chip for generating a laser light with TM polarization.

By joining the above-described slider 22 and light source unit 23, constituted is the thermal-assisted magnetic recording head 21. In the joining, the joining surface 2300 of the unit substrate 230 is made having a surface contact with the back surface 2201 of the slider substrate 220. Then, the locations of the unit substrate 230 and the slider substrate 220 are determined so that the laser light generated from the laser diode 40 can directly enter the waveguide 35 through the end surface 352 opposite to the ABS 2200 of the waveguide 35.

Each of the slider 22 and light source unit 23 may have an arbitrary size. For example, the slider 22 may be so-called a femto slider in which the width in the track width direction (Y-axis direction) is 700 µm; the length (in Z-axis direction) is 850 µm; and the thickness (in X-axis direction) is 230 µm. In the case, the light source unit 23 may be one size smaller than the slider 22, for example, in which the width in the track width direction is 425 µm; the length is 300 µm; and the thickness is 300 µm.

Figure 4:
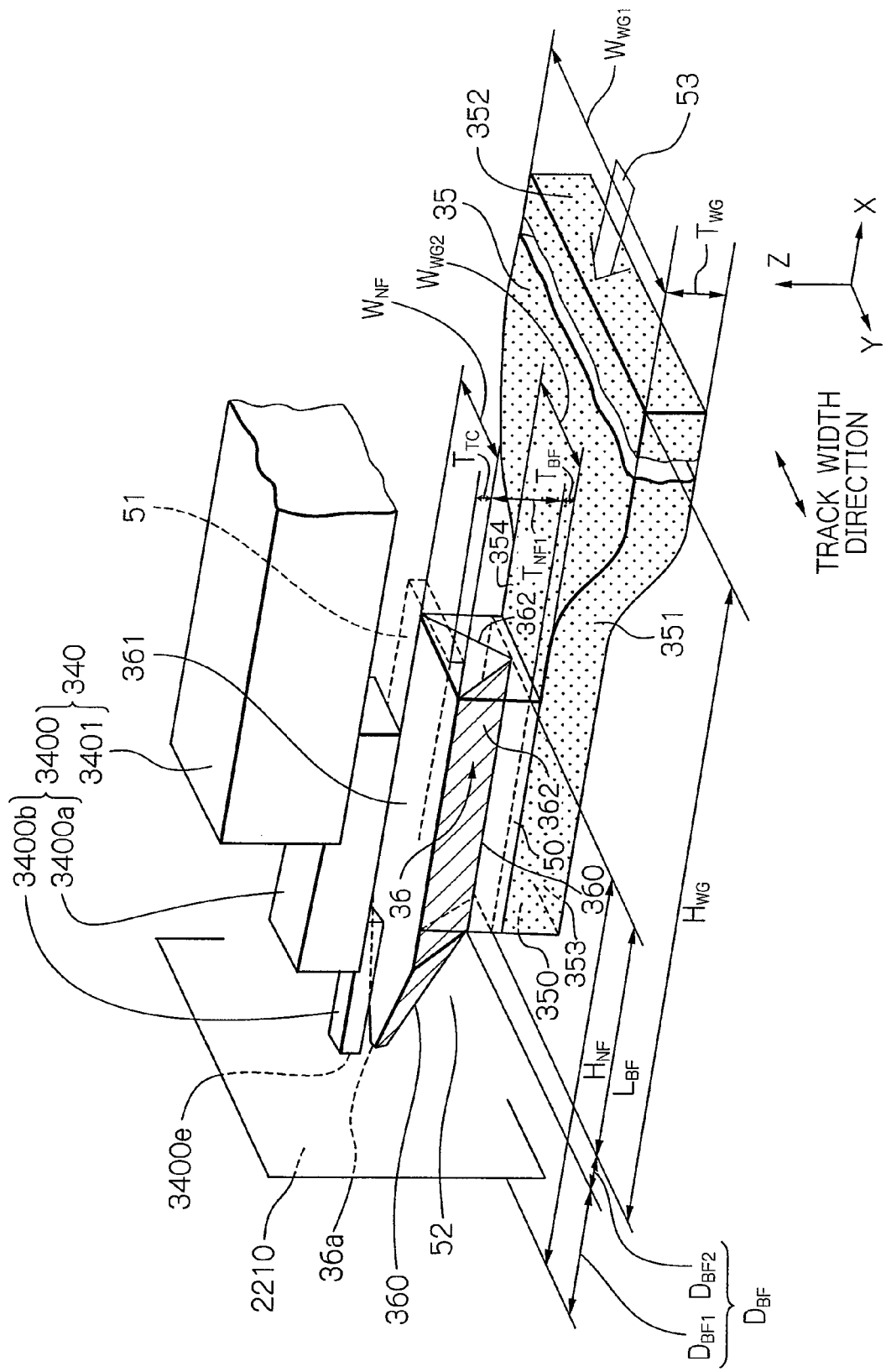
FIG. 4 shows a perspective view schematically illustrating the configuration of the waveguide, the surface plasmon antenna and the main magnetic pole.

FIG. 4 shows a perspective view schematically illustrating the configuration of the waveguide 35, the surface plasmon antenna 36 and the main magnetic pole 3400. In the figure, the head part end surface 2210 is positioned at the left side, the end surface 2210 including positions where write field and near-field light are emitted toward the magnetic recording medium.

Referring to FIG. 4, the configuration includes the waveguide 35 for propagating laser light 53 used for generating near-field light, and the surface plasmon antenna 36 that has a propagation edge 360 as an edge on which surface plasmon excited by the laser light 53 propagates. Further, the buffering portion 50 is a portion sandwiched between a portion of the side surface 354 of the waveguide 35 and a portion of the lower surface 362 including the propagation edge 360 of the surface plasmon antenna 36, the portions being opposed to each other. That is, a portion of the propagation edge 360 is covered with the buffering portion 50. The buffering portion 50 acts for coupling the laser light 53 with the surface plasmon antenna 36 in the surface plasmon mode. Here, a side surface of the waveguide 35 indicates, out of end surfaces surrounding the waveguide 35, end surfaces other than the end surface 350 on the head part end surface 2210 side and the end surface 352 on the opposite side, the end surfaces 350 and 352 being perpendicular to the propagating direction (−X direction) of the laser light 53. The side surface serves as a surface on which the propagating laser light 53 can be totally reflected in the waveguide 35 that corresponds to a core. In the present embodiment, the side surface 354 of the waveguide 35, a portion of which is in surface contact with the buffering portion 50, is the upper surface of the waveguide 35. And, the buffering portion 50 may be a portion of the overcoat layer 38 (FIG. 2) or a new layer provided other than the overcoat layer 38.

Further, the surface plasmon antenna 36 has a near-field light generating end surface 36a reaching the head part end surface 2210. The near-field light generating end surface 36a is close to an end surface 3400e of the main magnetic pole 3400, the surface 3400e reaching the head part end surface 2210. Moreover, the propagation edge 360 extends from its portion covered with the buffering portion 50 to the near-field light generating end surface 36a, the covered portion being coupled with the laser light 53 in the surface plasmon mode. Thus, the propagation edge 360 acts for propagating the surface plasmon excited by the laser light 53 to the near-field light generating end surface 36a. A portion on the head part end surface 2210 side of the propagation edge 360 is a straight or curved line extending so as to become closer to the end surface 361 on the side opposite to the edge 360 of the surface plasmon antenna 36 toward the near-field light generating end surface 36a. The propagation edge 360 can be made rounded to prevent surface plasmon from running off from the edge 360. The curvature radius of the rounded edge may be, for example, in the range of 5 to 500 nm.

Further, in the present embodiment, the surface plasmon antenna 36 tapers toward the near-field light generating end surface 36a in the height direction (Z-axis direction) near the head part end surface 2210. And the surface plasmon antenna 36 has a cross-section taken by YZ plane with a triangular shape, especially, has a predetermined triangular shape in the vicinity of the head part end surface 2210. As a result, in the present embodiment, the near-field light generating end surface 36a has a triangular shape (FIG. 5) in which one apex is the end of the propagation edge 360 reaching the end surface 36a. Here, surface plasmon propagating on the propagation edge 360 reaches the near-field light generating end surface 36a, and then causes near-field light to be generated from the end surface 36a.

The waveguide 35 and the buffering portion 50 are provided in −Z direction side, that is, in the side opposite to the main magnetic pole 3400 in relation to the surface plasmon antenna 36. As a result, the propagation edge 360, which is covered with the buffering portion 50, is also positioned on the side opposite to the main magnetic pole 3400 in the surface plasmon antenna 36. With such a configuration, even when a distance between the end surface 3400e of the main magnetic pole 3400 and the near-field light generating end surface 36a is sufficiently small, preferably 100 nm or less, the end surface 3400e generating write field and the end surface 36a emitting near-field light, the waveguide 35 can be sufficiently separated apart from the main magnetic pole 3400 and the main pole body 3401. Resultantly, there can be avoided such a situation in which a part of the laser light 53 is absorbed into the main magnetic pole 3400 and main pole body 3401 made of metal and the amount of light to be converted into the near-field light is reduced.

Also as shown in FIG. 4, the waveguide 35 may have a rectangular parallelepiped shape, or may have a portion on the head part end surface 2210 side, which has a narrower width in the track width direction (Y-axis direction). The width $W_{WG1}$ in the track width direction (Y-axis direction) of a portion on the side of the end surface opposite to the head part end surface 2210 of the waveguide 35 may be, for example, in the range approximately from 0.5 to 200 μm (micrometers). The width $W_{WG2}$ in the track width direction (Y-axis direction) of a portion on the end surface 350 side of the waveguide 35 may be, for example, in the range approximately from 0.3 to 100 μm. And the thickness $T_{WG}$ (in Z-axis direction) may be, for example, in the range approximately from 0.1 to 4 μm, and the height (length) $H_{WG}$ (in X-axis direction) may be, for example, in the range approximately from 10 to 300 μm.

Further, the side surfaces of the waveguide 35: the upper surface 354; the lower surface 353; and both the side surfaces 351 in the track width direction (Y-axis direction) have a contact with the overcoat layer 38 (FIG. 2) except the portion having a surface contact with the buffering portion 50. Here, the waveguide 35 is formed of a material with refractive index $n_{WG}$ higher than refractive index $n_{OC}$ of the constituent material of the overcoat layer 38, made by using, for example, a sputtering method. For example, in the case that the overcoat layer 38 is formed of $SiO_2$ (n=1.5), the waveguide 35 can be formed of, for example, $Al_2O_3$ (n=1.63). Further, in the case that the overcoat layer 38 is formed of $SiO_2$ (n=1.5) under the laser light wavelength $\lambda_L$ of 600 nm, the waveguide 35 can be formed of, for example, $Al_2O_3$ (n=1.63). Further, in the case that the overcoat layer 38 is formed of $Al_2O_3$ (n=1.63), the waveguide 35 can be formed of, for example, $SiO_XO_Y$ (n=1.7-1.85), $Ta_2O_5$ (n=2.16), $Nb_2O_5$ (n=2.33), TiO (n=2.3-2.55) or $TiO_2$ (n=2.3-2.55). This material structure of the waveguide 35 enables the propagation loss of laser light 53 to be reduced due to the excellent optical characteristics of the constituent material. Further, the waveguide 35 can provide the total reflection in all the side surfaces due to the existence of the overcoat layer 38 as a clad. As a result, more amount of laser light 53 can reach the position of the buffering portion 50, which improves the propagation efficiency of the waveguide 35.

Further, alternatively, the waveguide 35 may have a multilayered structure of dielectric materials in which the upper a layer is, the higher becomes the refractive index n of the layer. The multilayered structure can be realized, for example, by sequentially stacking dielectric materials of $Si_XN_Y$ with the composition ratios X and Y appropriately changed. The number of stacked layers may be, for example, in the range from 8 to 12. In the case that laser light 53 has a linear polarization in Z-axis direction, the above-described structure enables the laser light 53 to propagate in the position closer to the buffering portion 50. In this case, by choosing the composition and layer thickness in each layer, and the number of layers of the multilayered structure, the laser light 53 can propagate in the desired position in Z-axis direction.

The surface plasmon antenna 36 is preferably formed of a conductive material of, for example, metal such as Pd, Pt, Rh, Ir, Ru, Au, Ag, Cu or Al, or an alloy made of at least two of these elements. Further, the surface plasmon antenna 36 can have a width $W_{NF}$ in the track width direction (Y-axis direction) sufficiently smaller than the wavelength of the laser light 53, for example, of approximately 10 to 100 nm. And the surface plasmon antenna 36 can have a thickness $T_{NF1}$ (in Z-axis direction) sufficiently smaller than the wavelength of the laser light 53, for example, of approximately 10 to 100 nm. Further, the length (height) $H_{NF}$ (in X-axis direction) can be set to be, for example, in the range of, approximately, 0.8 to 6.0 μm.

The buffering portion 50 is formed of a dielectric material having refractive index $n_{BF}$ lower than the refractive index $n_{WG}$ of the waveguide 35. For example, when the wavelength $\lambda_L$ of the laser light is 600 nm and the waveguide 35 is formed of $Al_2O_3$ (n=1.63), the buffering portion 50 may be formed of $SiO_2$ (n=1.46). Further, when the waveguide 35 is formed of $Ta_2O_5$ (n=2.16), the buffering portion 50 may be formed of $SiO_2$ (n=1.46) or $Al_2O_3$ (n=1.63). In these cases, the buffering portion 50 can be a portion of the overcoat layer 38 (FIG. 2) serving as a clad made of $SiO_2$ (n=1.46) or $Al_2O_3$ (n=1.63). The length (in X-axis direction) of the buffering portion 50, namely, the length $L_{BF}$ of a coupling portion between the waveguide 35 and the surface plasmon antenna 36 is preferably in the range of 0.5 to 5 μm. Preferably, the thickness $T_{BF}$ (in Z-axis direction) of the buffering portion 50 is in the range of 10 to 200 nm. The length $L_{BF}$ and the thickness $T_{BF}$ are important parameters for obtaining proper excitation and propagation of surface plasmon. The end on the head part end surface 2210 side of the buffering portion 50 is positioned apart from the head part end surface 2210 by a distance $D_{BF}$ in X-axis direction. The propagation distance of surface plasmon is adjusted by the distance $D_{BF}$.

Also as shown in FIG. 4, a thermal conduction layer 51 is preferably provided on the head part end surface 2210 side between the surface plasmon antenna 36 and the first main pole portion 3400a. The thermal conduction layer 51 is formed of, for example, an insulating material such as AlN, SiC or DLC, which has higher thermal conductivity compared with that of the overcoat layer 38 (FIG. 2). The arrangement of such a thermal conduction layer 51 allows a part of the heat generated when the surface plasmon antenna 36 emits near-field light to get away to the main magnetic pole 3400 and the first main pole portion 3400a through the thermal conduction layer 51. That is, the main magnetic pole 3400 and the first main pole portion 3400a can be used as a heatsink. Resultantly, excessive temperature rise of the surface plasmon antenna 36 can be suppressed, and there can be avoided unwanted protrusion of the near-field light generating end surface 36a and substantial reduction in the light use efficiency of the surface plasmon antenna 36.

The thickness $T_{TC}$ of the thermal conduction layer 51 corresponds to a distance $D_{N-P}$ (FIG. 5) between the near-field light generating end surface 36a and the end surface 3400e of the main magnetic pole 3400, and is set to be a small value of 100 nm or less. Further, the refractive index $n_{IN2}$ of the thermal conduction layer 51 is set equal to or lower than the refractive index $n_{IN1}$ of the insulating layer 52 that covers the propagation edge 360 of the surface plasmon antenna 36. That is, the propagation edge 360 of the surface plasmon antenna 36 is covered with a material having a refractive index $n_{IN1}$ equal to or higher than the refractive index $n_{IN2}$ of a material covering the end surface 361 opposite to the edge 360. This allows surface plasmon to propagate stably on the propagation edge 360. It is known to be preferable in practice to satisfy the relation of refractive index $n_{IN1} \geq$ refractive index $n_{IN2} \times 1.5$.

Also according to FIG. 4, the main magnetic pole layer 340 includes, as described-above, the main magnetic pole 3400 and the main pole body 3401. The main magnetic pole 3400 includes; the first main pole portion 3400a having the end surface 3400e reaching the head part end surface 2210; and the second main pole portion 3400b, the end portion on the head part end surface 2210 side of which is overlapped on a portion of the first main pole portion 3400a, the portion being on the side opposite to the head part end surface 2210. Further, the end portion on the head part end surface 2210 side of the main pole body 3401 is overlapped on a portion of the second main pole portion 3400b, the portion being on the side opposite to the head part end surface 2210. Namely, the end portion on the head part end surface 2210 side of the main magnetic pole layer 340 has a shape extending slantwise relative to the element-formation surface 2202 (FIG. 3) toward the end portion on the head part end surface 2210 side of the surface plasmon antenna 36. As a result, the end surface 3400e of the main magnetic pole layer 340 can be made sufficiently close to the near-field light generating end surface 36a, under the condition that the main magnetic pole layer 340 is sufficiently separated apart from the waveguide 35.

Figure 5:
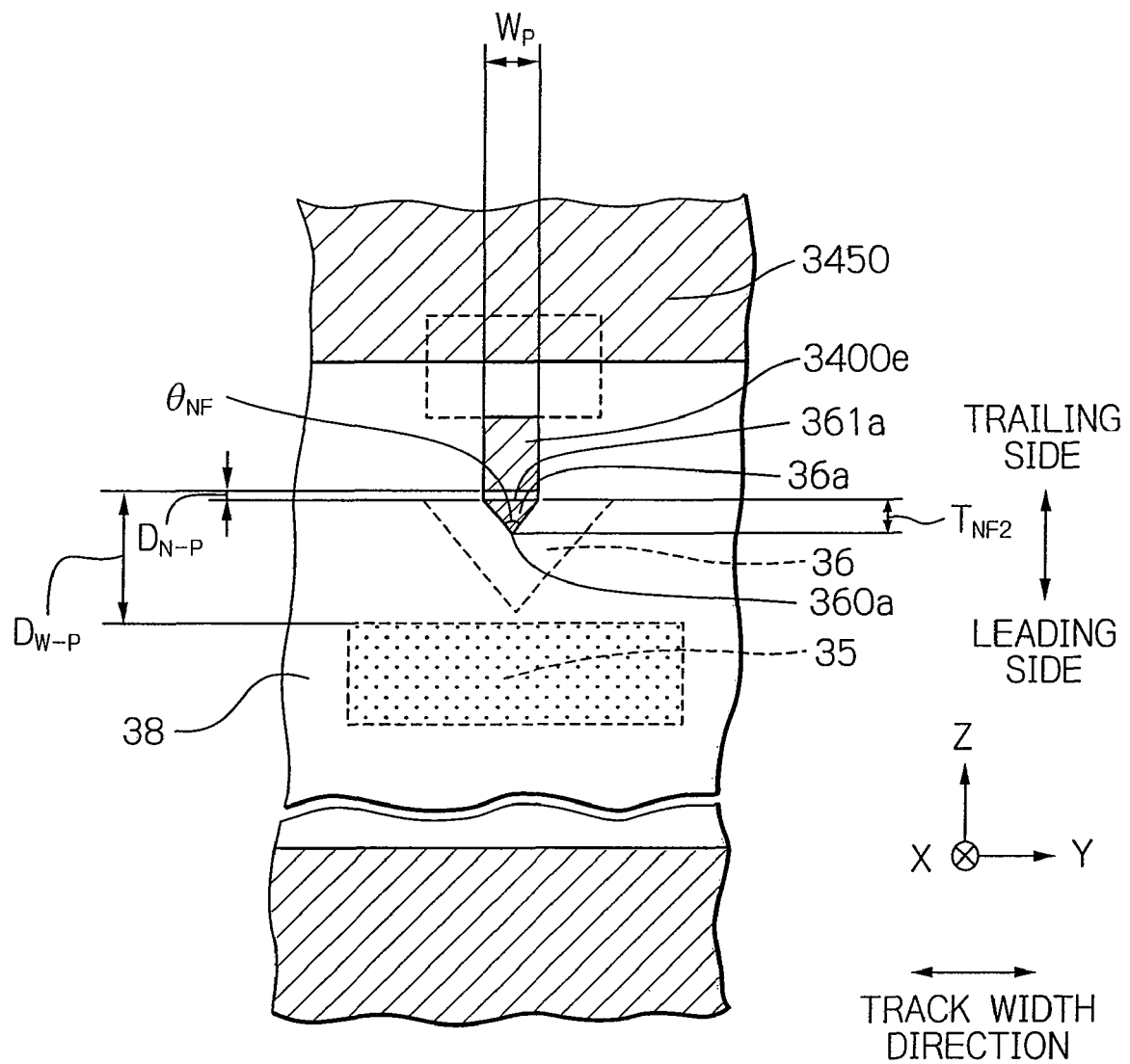
FIG. 5 shows a plan view illustrating the shapes of the end surfaces of the surface plasmon antenna and the electromagnetic transducer on the head part end surface.

FIG. 5 shows a plan view illustrating the shapes of the end surfaces of the surface plasmon antenna 36 and the electromagnetic transducer 34 on the head part end surface 2210.

As shown in FIG. 5, the main magnetic pole 3400 (the first main pole portion 3400a) and the write shield layer 345 (the trailing shield 3450) of the electromagnetic transducer 34 reach the head part end surface 2210. The shape of the end surface of the main magnetic pole 3400 on the head part end surface 2210 is, for example, a rectangle, a square or a trapezoid. Here, the above-described width $W_P$ is a length of the edge on the leading side of the end surface 3400e of the main magnetic pole 3400, and provides the width of a track formed on the magnetic recording layer of the magnetic disk. The width $W_P$ is, for example, in the range of approximately 0.05 to 0.5 μm.

Moreover, on the head part end surface 2210, the near-field light generating end surface 36a of the surface plasmon antenna 36 is positioned close to the end surface 3400e of the main magnetic pole 3400 and in the leading side (−Z direction side) of the end surface 3400e. Here, a distance $D_{N-P}$ between the near-field light generating end surface 36a and the end surface 3400e is set to be a sufficiently small value of, for example, 100 nm or less, preferably 20 nm or more, and more preferably 30 nm or more, as described by using practical examples later. In the thermal-assisted magnetic recording according to the present invention, the near-field light generating end surface 36a functions as a main heating action part, and the end surface 3400e functions as a writing action part. Therefore, write field with sufficiently large gradient can be applied to a portion of the recording layer of the magnetic disk, which has been sufficiently heated. This enables a stable thermal-assisted write operation to be securely achieved.

Furthermore, in the present embodiment, the near-field light generating end surface 36a has a shape of isosceles triangle on the head part end surface 2210, having a bottom edge 361a on the trailing side (+Z side) and an apex on the leading side (−Z side) that is an end 360a of the propagation edge 360. The height $T_{NF2}$ of the near-field light generating end surface 36a (the thickness of the surface plasmon antenna 36 on the head part end surface 2210) is preferably 30 nm or less, and more preferably 20 nm or less, as described by using practical examples later. Thereby, the near-field-light emitting position on the end surface 36a becomes close to the edge 361a on the trailing side, that is, closer to the end surface 3400e of the main magnetic pole 3400. Further, the apex angle $\theta_{NF}$ of the apex 360a of the isosceles triangle is preferably 60 to 130 degrees, and more preferably 80 to 110 degrees, as described by using practical examples later. This adjustment of the apex angle $\theta_{NF}$ enables the near-field-light emitting position on the end surface 36a to be further on the trailing side.

Further, a distance $D_{W-P}$ between the waveguide 35 and the main magnetic pole 3400 is made sufficiently large while the distance $D_{N-P}$ is set to a minute value as described above. That is, with the structure according to the present invention shown in FIG. 4, the waveguide 35 can be sufficiently separated apart from the main magnetic pole 3400 and the main pole body 3401. Resultantly, there can be avoided such a situation in which a part of the laser light is absorbed into the main magnetic pole 3400 and the main pole body 3401 made of metal and the amount of light to be converted into near-field light is reduced.

Figure 6:
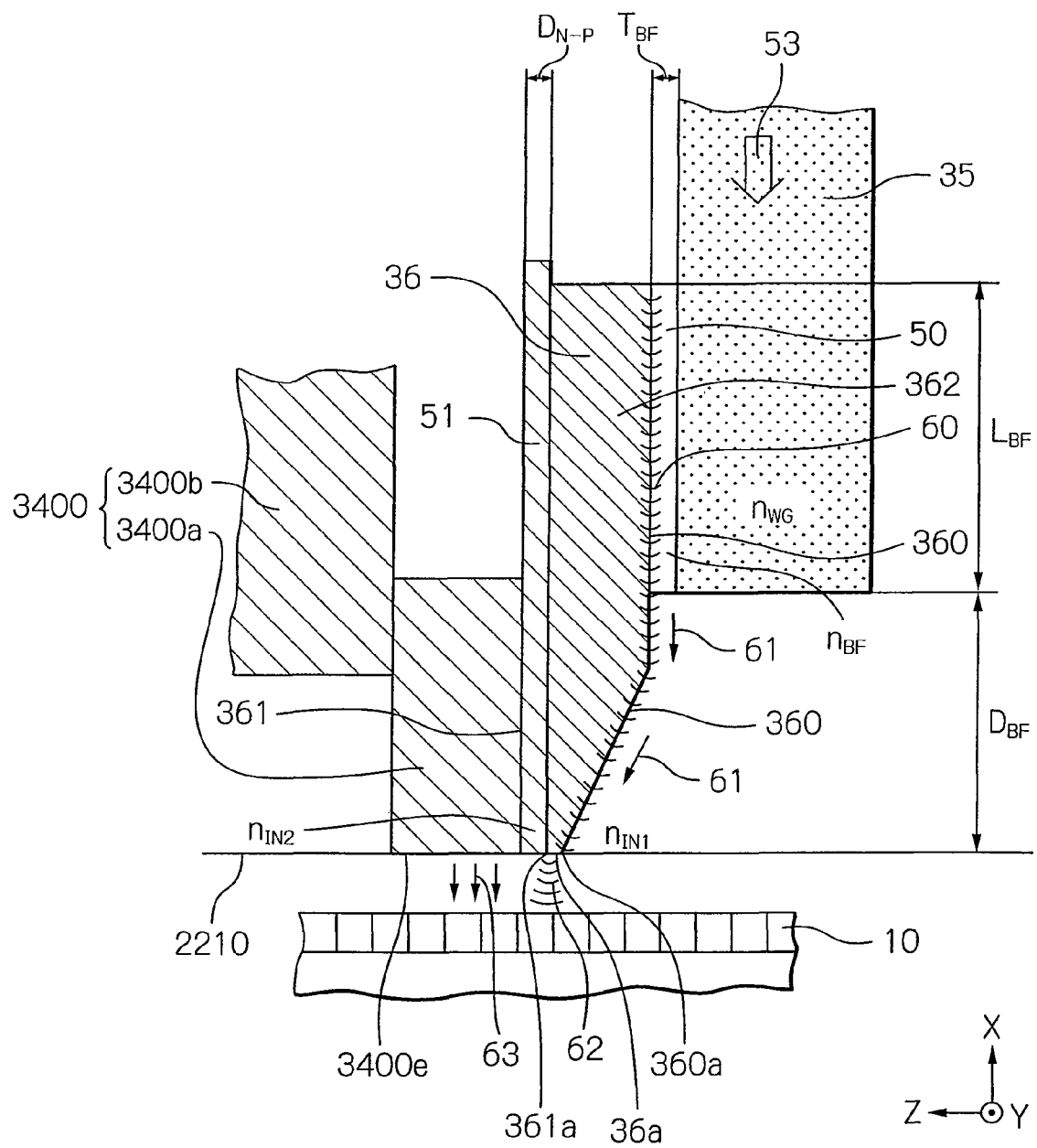
FIG. 6 shows a schematic diagram for explaining the thermal-assisted magnetic recording utilizing the surface plasmon mode according to the present invention.

FIG. 6 shows a schematic diagram for explaining the thermal-assisted magnetic recording utilizing the surface plasmon mode according to the present invention.

Referring to FIG. 6, when the electromagnetic transducer 34 writes data onto the recording layer of the magnetic disk 10, first, laser light 53 emitted from the laser diode 40 of the light source unit 23 propagates through the waveguide 35. Next, the laser light 53, which has advanced to near the buffering portion 50, couples with the optical configuration including the waveguide 35 with a refractive index $n_{WG}$, the buffering portion 50 with a refractive index $n_{BF}$ and the surface plasmon antenna 36 made of conductive material such as metal, and induces the surface plasmon mode on the propagation edge 360 of the surface plasmon antenna 36. That is, the laser light couples with the surface plasmon antenna 36 in the surface plasmon mode. Actually, evanescent light is excited within the buffering portion 50 based on an optical boundary condition between the waveguide 35 as a core and the buffering portion 50. Then, the evanescent light couples with the fluctuation of electric charge excited on the metal surface (propagation edge 360) of the surface plasmon antenna 36, and induces the surface plasmon mode. To be exact, there excited is surface plasmon polariton in this system because surface plasmon as elementary excitation is coupled with an electromagnetic wave. However, the surface plasmon polariton will be hereinafter referred to as surface plasmon for short. The propagation edge 360 is located closest to the waveguide 35 on the inclined lower surface 362 of the surface plasmon antenna 36, and is just an edge where electric field tends to converge and thus surface plasmon can easily be excited. In this case, the surface plasmon mode can be induced by setting the refractive index $n_{BF}$ of the buffering portion 50 smaller than the refractive index $n_{WG}$ of the waveguide 35 ($n_{BF} < n_{WG}$), and further by properly selecting the height (in X-axis direction) of the buffering portion 50, namely, the length $L_{BF}$ of the coupling portion between the waveguide 35 and the surface plasmon antenna 36, and the thickness $T_{BF}$ (in Z-axis direction) of the buffering portion 50. The inducement of the surface plasmon mode is described in, for example, Michael Hochberg, Tom Baehr-Jones, Chris Walker & Axel Scherer, "Integrated Plasmon and dielectric waveguides", OPTICS EXPRESS Vol. 12, No. 22, pp 5481-5486 (2004), and US patent Publication No. 2005/0249451 A1.

In the induced surface plasmon mode, the surface plasmon 60 is excited on the propagation edge 360 of the surface plasmon antenna 36, and propagates on the propagation edge 360 along the direction shown by arrows 61. The propagation of the surface plasmon 60 can occur under the condition that the propagation edge 360 of the surface plasmon antenna 36 is covered with a material having refractive index $n_{IN1}$ equal to or higher than the refractive index $n_{IN2}$ of a material covering the end surface 361 on the side opposite to the edge 360. It is known to be preferable in practice to satisfy the relation of refractive index $n_{IN1}$=refractive index $n_{IN2} \times 1.5$. In FIG. 6, the refractive index $n_{IN2}$ of the thermal conduction layer 51 is set so as to be smaller than the refractive index $n_{IN1}$ of the insulating layer 52 covering the propagation edge 360 of the surface plasmon antenna 36.

By the above-described propagation of the surface plasmon 60, the surface plasmon 60, namely, electric field converges in the near-field light generating end surface 36a that reaches the head part end surface 2210 and includes the apex 36a that is the destination of the propagation edge 360. As a result, near-field light 62 is emitted from the near-field light generating end surface 36a. The near-field light 62 is radiated toward the magnetic recording layer of the magnetic disk 10, and reaches the surface of the magnetic disk 10 to heat a portion of the magnetic recording layer of the magnetic disk 10. This heating reduces the anisotropic magnetic field (coercive force) of the portion to a value with which write operation can be performed. Immediately after the heating, write field 63 generated from the main magnetic pole 3400 is applied to the portion to perform write operation. Thus, a thermal-assisted magnetic recording can be achieved.

As described above, by adjusting the shape and size of the near-field light generating end surface 36a on the head part end surface 2210, the emitting position of near-field light 62 on the end surface 36a can be set to be closer to the first main pole portion 3400a on the trailing side (on the edge 361a side). In the case, write field with sufficiently large gradient can be applied to a portion of the magnetic recording layer of the magnetic disk 10, which has been sufficiently heated. This enables a stable thermal-assisted write operation to be securely achieved.

Further, the propagation edge 360 for propagating surface plasmon of the surface plasmon antenna 36 according to the present invention is a propagation region with a very narrow width in the track width direction. In the present embodiment, the cross-section taken by YZ plane of the surface plasmon antenna 36 has a triangular shape, especially a predetermined triangular shape in the vicinity of the head part end surface 2210. Therefore, the near-field light generating end surface 36a, which appears as a polished surface on the head part end surface 2210 processed through polishing in the manufacturing of the head, can be made a desired shape (a triangle in the present embodiment) with a very small size, and further can be set so that surface plasmon propagates to reach the end surface 36a reliably.

In the thermal-assisted magnetic recording with use of the surface plasmon mode as presented above, the light use efficiency in the surface plasmon antenna 36 is remarkably improved to be about 20%, while the use efficiency of a case, in which a conventional plasmon antenna is used, is around 5 to 10% or less as seen in reported examples. This improvement can prevent the excessive temperature rise of the surface plasmon antenna 36, and can suppress the protrusion of the near-field light generating end surface 36a toward the magnetic disk 10.

Further, in a conventional case in which the laser light propagating through a waveguide directly irradiates a plasmon antenna provided on the end surface of a head, most of the irradiated laser light has been converted into thermal energy within the plasmon antenna. In this case, the size of the plasmon antenna has been set smaller than the wavelength of the laser light, and its volume is very small. Therefore, the plasmon antenna has been brought to a very high temperature, for example, 500° C. (degrees Celsius) due to the thermal energy. On the contrary, in the thermal-assisted magnetic recording according to the present invention, the surface plasmon mode is used, and the near-field light 62 is generated by propagating the surface plasmon 60 toward the head part end surface 2210. This brings the temperature at the near-field light generating end surface 36a to, for example, about 100° C. during the emission of near-field light, which is greatly reduced compared to the conventional. This reduction of temperature resultantly allows the protrusion of the near-field light generating end surface 36a toward the magnetic disk 10 to be suppressed, thereby favorable thermal-assisted magnetic recording can be achieved.

Figure 7A:
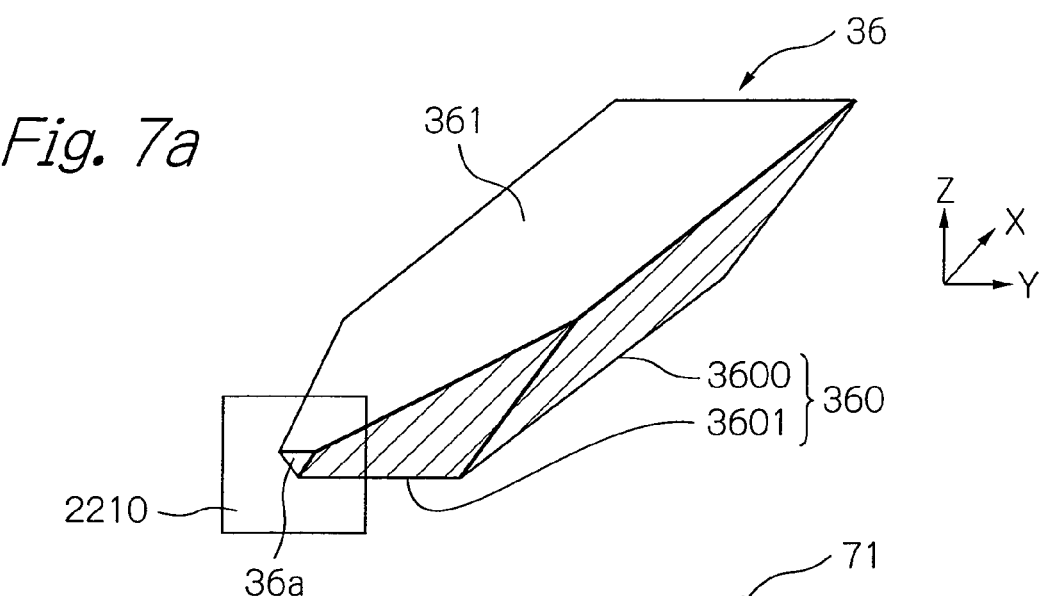
FIGS. 7a to 7c show schematic views illustrating various embodiments of the surface plasmon antenna according to the present invention.
Figure 7B:
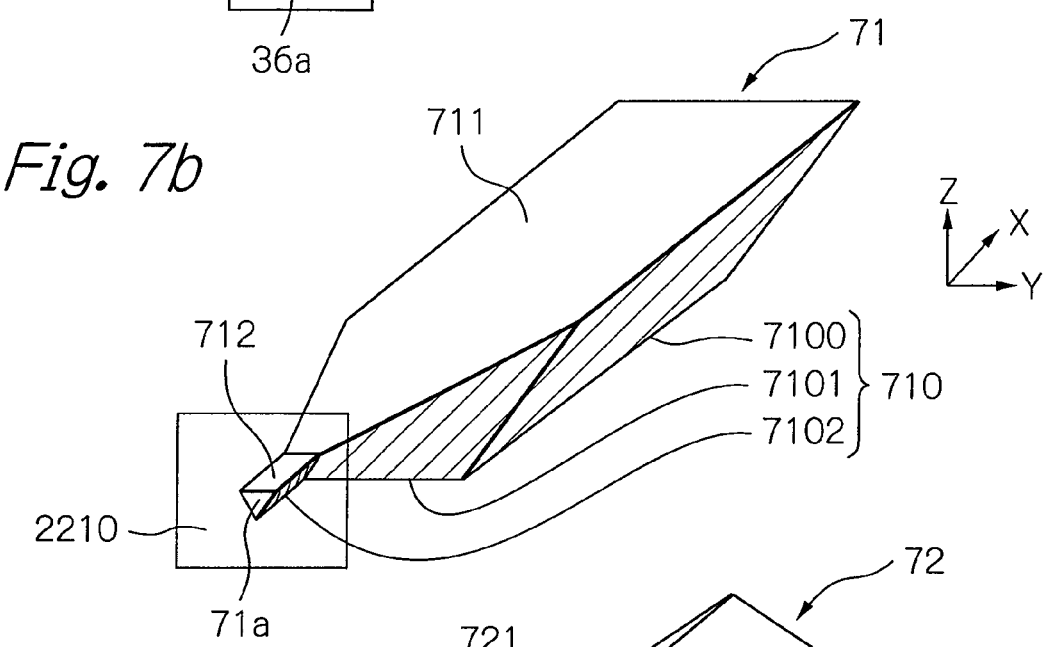
Figure 7C:
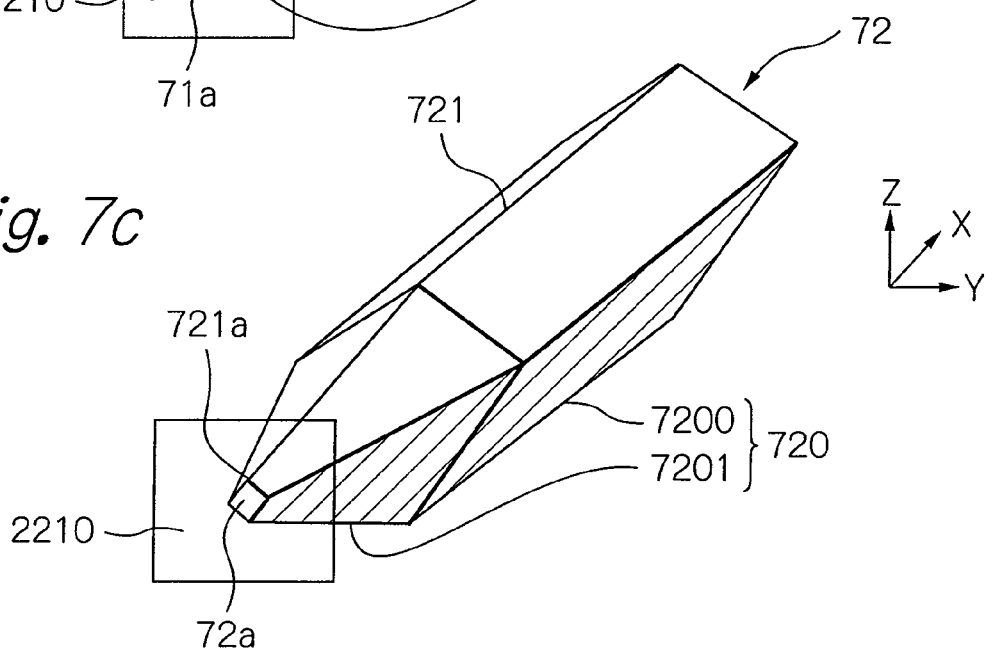

FIGS. 7a to 7c show schematic views illustrating various embodiments of the surface plasmon antenna according to the present invention.

Referring to FIG. 7a, a surface plasmon antenna 36 shown in FIG. 4 has a shape of a blade. A propagation edge 360 analogous to the edge of the blade includes: a portion 3600 parallel to the upper surface 361 that is an end surface opposite to the propagation edge 360; and a portion 3601 that extends in such a manner that it approaches the upper surface 361 as it extends toward the near-field light generating end surface 36a, and reaches the near-field light generating end surface 36a (the head part end surface 2210). A cross-section taken by YZ plane (the plane parallel to the head part end surface 2210) has a shape of an isosceles triangle with an apex as a portion of the propagation edge 360. The near-field light generating end surface 36a also has a shape of an isosceles triangle.

Referring to FIG. 7b, a surface plasmon antenna 71 has a shape in which a projecting portion 712 is coupled to a blade-like portion. A propagation edge 710 analogous to the edge of the blade includes: a portion 7100 parallel to the upper surface 711 of the antenna 71; a portion 7101 that extends in such a manner that it approaches the upper surface 711 as it extends toward a near-field light generating end surface 71a; and a portion 7102 that is parallel to the upper surface 711 and reaches the near-field light generating end surface 71a (the head part end surface 2210). A cross section taken by YZ plane (a plane parallel to the head part end surface 2210) has a shape of an isosceles triangle with one apex as a portion of the propagation edge 710. The near-field light generating end surface 71a also has an isosceles triangular shape.

In the surface plasmon antenna 71, the emitting position on the near-field light generating end surface 71a where near-field light is emitted can be adjusted, for example, upward (toward +Z side) by adjusting the apex angle and size of the isosceles triangle of the near-field light generating end surface 71a. Consequently, the surface plasmon antenna 71 can be disposed sufficiently close to the main magnetic pole, and write field having a sufficiently large gradient can be applied to a sufficiently heated portion of the magnetic recording layer of a magnetic disk.

Referring to FIG. 7c, a surface plasmon antenna 72 includes a near-field light generating end surface 72a having a shape of a quadrangle (a rhombus in the present embodiment). Its propagation edge 720 includes: a portion 7200 parallel to an upper edge 721; and a portion 7201 that extends in such a manner that it approaches the upper edge 721 as it extends toward the near-field light generating end surface 72a, and reaches the near-field light generating end surface 72a (the head part end surface 2210). A cross section taken by YZ plane (a plane parallel to the head part end surface 2210) has a shape of a quadrangle (a rhombus in the present embodiment) with one apex as a portion of the propagation edge 720.

In the surface plasmon antenna 72, the emitting position on the near-field light generating end surface 72a where near-field light is emitted can be controlled, for example, to an end 721a of the edge 721 by adjusting the apex angles and size of the rhombus of the near-field light generating end surface 72a. Consequently, the surface plasmon antenna 72 can be disposed sufficiently closer to the main magnetic pole, and write field having a sufficiently large gradient can be applied to a sufficiently heated portion of the magnetic recording layer of a magnetic disk.

FIGS. 8a to 8d show schematic views illustrating various embodiments relating to the shapes and arrangements of a waveguide, a surface plasmon antenna and a main magnetic pole according to the present invention.

Figure 8A:
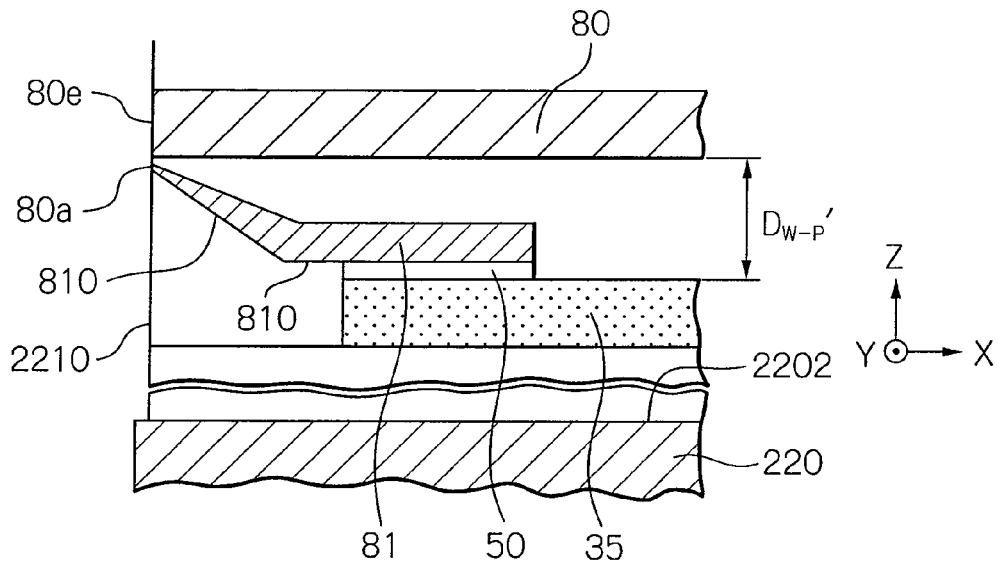
FIGS. 8a to 8d show schematic views illustrating various embodiments relating to the shapes and arrangements of a waveguide, a surface plasmon antenna and a main magnetic pole according to the present invention.

Referring to FIG. 8a, a main magnetic pole 80 is one layer extending parallel to the element-formation surface 2202. A portion of the surface plasmon antenna 81 on the head part end surface 2210 side is inclined with respect to the element-formation surface 2202 so as to become closer to the end of the main magnetic pole 80 on the head part end surface 2210 side toward the head part end surface 2210. In this embodiment, the distance $D_{W-P}'$ between the waveguide 35 and the main magnetic pole 80 in Z-axis direction can be set to a sufficiently large value while the near-field light generating end surface 81a of the surface plasmon antenna 81 is positioned near the end surface 80e of the main magnetic pole 80 on the head part end surface 2210. Resultantly, there can be more reliably avoided such a situation in which a part of the laser light is absorbed into the main magnetic pole and the amount of light to be converted into the near-field light is reduced.

Figure 8B:
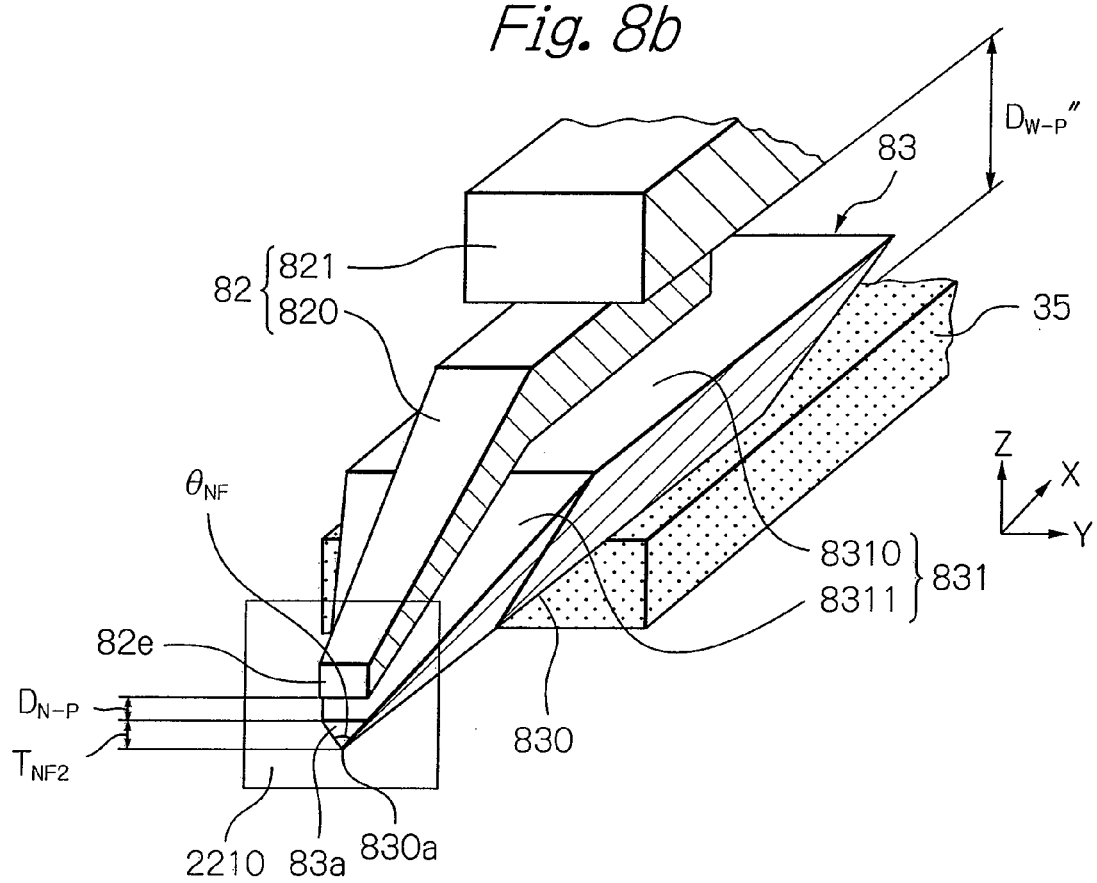

Referring to FIG. 8b, a surface plasmon antenna 83 includes a propagation edge 830 extending straightly to a near-field generating end surface 83a. The end surface 831 of the surface plasmon antenna 83 on the side opposite to the propagation edge 830 includes a portion 8310 parallel to the propagation edge 830 and a portion 8311 inclined so as to become closer to the propagation edge 830 toward the near-field light generating end surface 83a. A cross section taken by YZ plane (a plane parallel to the head part end surface 2210) has a shape of an isosceles triangle with an apex as a portion of the propagation edge 830. The near-field light generating end surface 83a also has a shape of an isosceles triangle.

The main magnetic pole layer 82 includes a main magnetic pole 820 and a main pole body 821. A portion of the main magnetic pole 820 on the head part end surface 2210 side is inclined toward a portion of the surface plasmon antenna 83 on the head part end surface 2210 side, that is, the end surface portion 8311, as it approaches the head part end surface 2210. Also in this embodiment, the distance $D_{W-P}''$ between the waveguide 35 and the main magnetic pole layer 82 in the Z-axis direction can be set to a sufficiently large value while the near-field light generating end surface 83a of the surface plasmon antenna 83 is positioned near the end surface 82e of the main magnetic pole layer 82 on the head part end surface 2210. Resultantly, there can be more reliably avoided such a situation in which a part of the laser light is absorbed into the main magnetic pole and the amount of light to be converted into the near-field light is reduced.

Figure 8C:
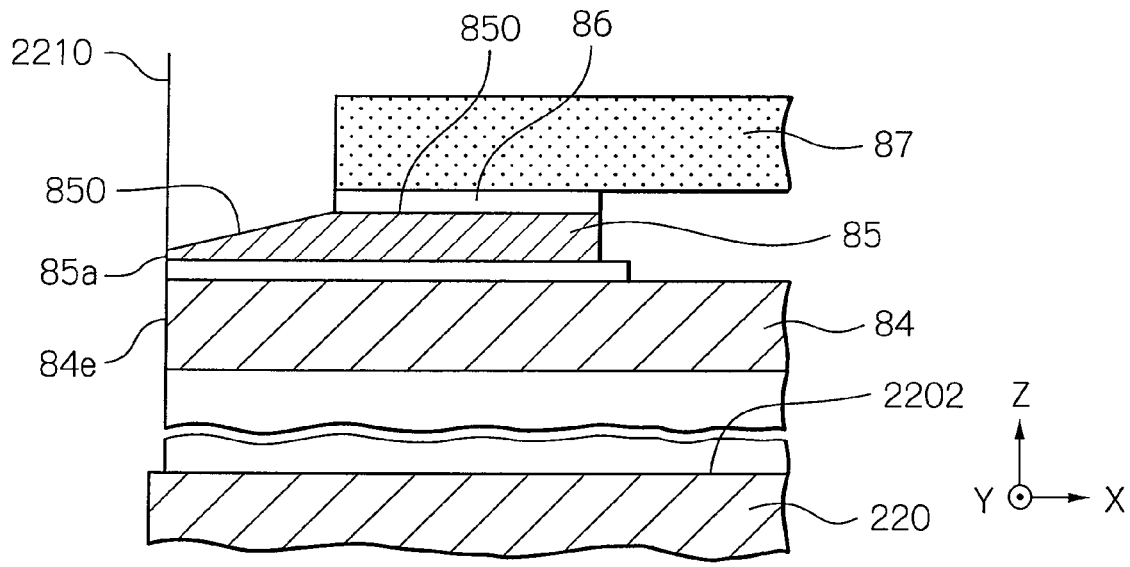

Referring to FIG. 8c, in the present embodiment, a main magnetic pole 84, a surface plasmon antenna 85, a buffering portion 86, and a waveguide 87 are sequentially stacked toward +Z direction, starting from the slider substrate 220 side. A propagation edge 850 for propagating surface plasmon is positioned on the side opposite to the main magnetic pole 84 of the surface plasmon antenna 85, and extends to the near-field light generating end 85a. Consequently, the near-field light generating end 85a on the head part end surface 2210 is located in the trailing side (+Z side) of the end surface 84e of the main magnetic pole 84. Also in this embodiment, the near-field light generating end 85a can be positioned sufficiently near the end surface 84e of the main magnetic pole 84, and write field having a sufficiently large gradient can be applied to a sufficiently heated portion of the magnetic recording layer of a magnetic disk.

Figure 8D:
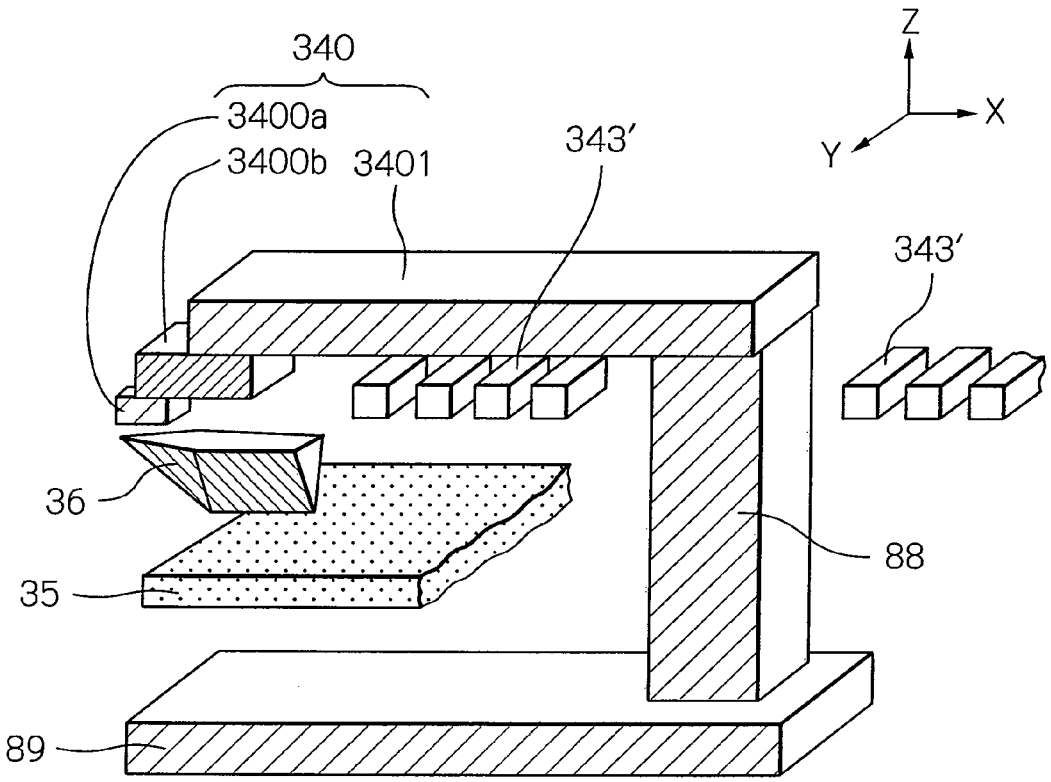

In the embodiment shown in FIG. 8d, the configuration of a waveguide 35, a surface plasmon antenna 36 and a main magnetic pole layer 340 is the same as that shown in FIGS. 3 and 4. However, a write shield layer 89, which is a return yoke for receiving a magnetic flux returned from a magnetic disk, is provided in the side opposite to the main magnetic pole layer 340 in relation to the waveguide 35 and surface plasmon antenna 36, that is, in the leading side (in −Z side) of the waveguide 35 and surface plasmon antenna 36. The write shield layer 89 and the main magnetic pole layer 340 are magnetically connected with each other through a back contact portion 88. A write coil layer 343' is formed so as to pass through in one turn at least between the main magnetic pole layer 340 and the write shield layer 89, and has a spiral structure with the back contact portion 88 as a center. Also in this embodiment, favorable thermal-assisted magnetic recording can be performed by using the surface plasmon according to the present invention.

Figure 9:
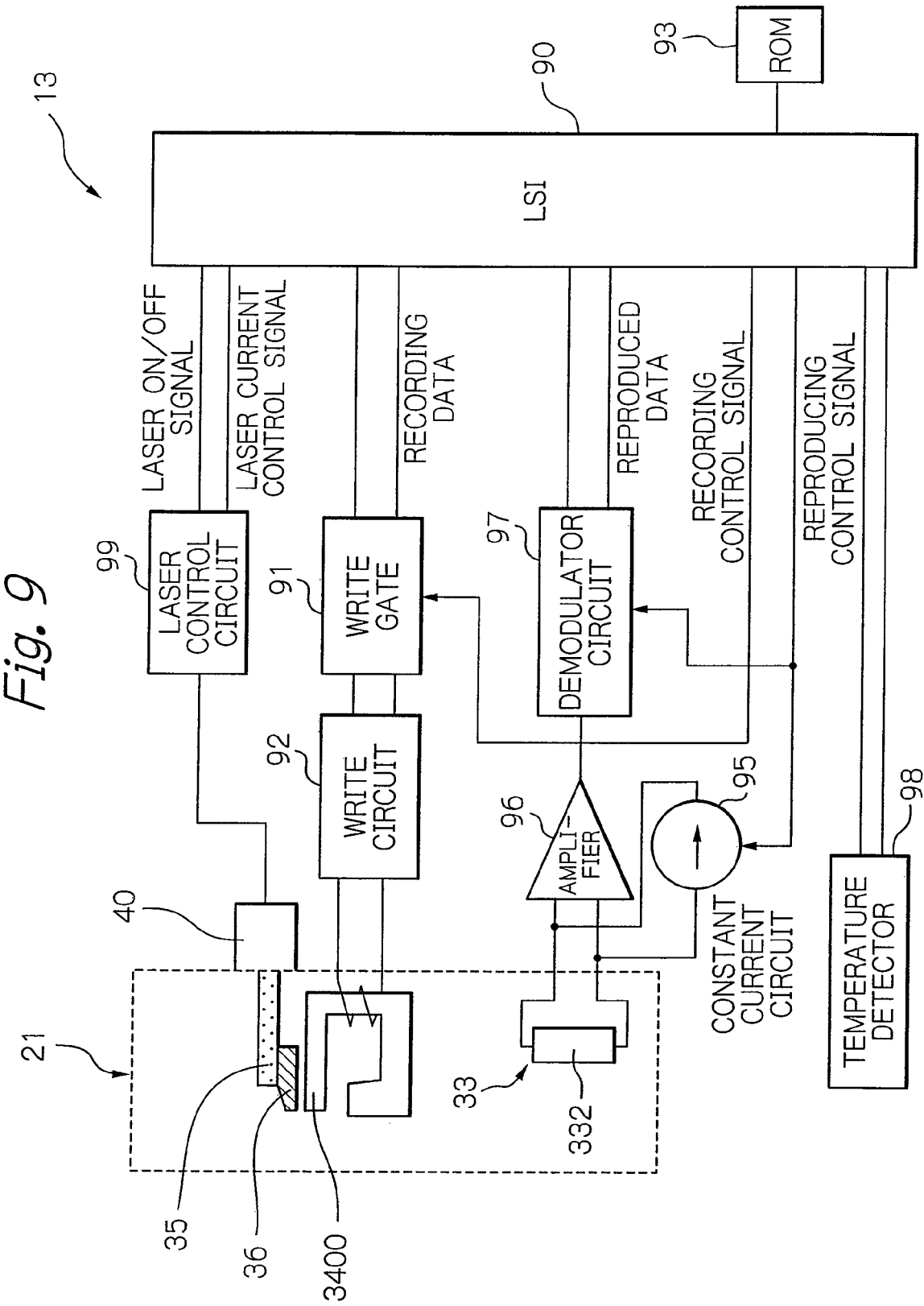
FIG. 9 shows a block diagram illustrating the circuit structure of the recording/reproducing and light-emission control circuit of the magnetic disk apparatus shown in FIG. 1.

FIG. 9 shows a block diagram illustrating the circuit structure of the recording/reproducing and light-emission control circuit 13 of the magnetic disk apparatus shown in FIG. 1.

In FIG. 9, reference numeral 90 indicates a control LSI, 91 indicates a write gate for receiving recording data from the control LSI 90, 92 indicates a write circuit, 93 indicates a ROM that stores a control table or the like for controlling the value of drive current supplying to the laser diode 40, 95 indicates a constant current circuit for supplying sense current to the MR element 33, 96 indicates an amplifier for amplifying the output voltage from the MR element 33, 97 indicates a demodulator circuit for outputting reproduced data to the control LSI 90, 98 indicates a temperature detector, and 99 indicates a control circuit for controlling the laser diode 40, respectively.

The recording data outputted from the control LSI 90 is supplied to the write gate 91. The write gate 91 supplies recording data to the write circuit 92 only when a recording control signal outputted from the control LSI 90 instructs a write operation. The write circuit 92 applies write current according to this recording data to the write coil layer 343, and then a write operation is performed onto the magnetic disk by write field generated from the main magnetic pole 3400.

A constant current flows from the constant current circuit 95 into the MR multilayer 332 only when the reproducing control signal outputted from the control LSI 90 instructs a read operation. The signal reproduced by the MR element 33 is amplified by the amplifier 96, demodulated by the demodulator circuit 97, and then, the obtained reproduced data is outputted to the control LSI 90.

The laser control circuit 99 receives a laser ON/OFF signal and a drive current control signal, which are outputted from the control LSI 90. When the laser ON/OFF signal is an ON operation instruction, a drive current of an oscillation threshold value or more flows into the laser diode 40. Thereby, the laser diode 40 emits light; then the laser light propagates through the waveguide 35 and couples with the surface plasmon antenna 36 in the surface plasmon mode. As a result, near-field light is generated from the end of the surface plasmon antenna 36, irradiated on the magnetic recording layer of the magnetic disk, and heats the magnetic recording layer. The value of drive current in this occasion is controlled to a value corresponding to the drive current control signal. The control LSI 90 generates the laser ON/OFF signal with its timing adjusted according to recording/reproducing operations, and determines the value of drive current control signal, by referring the temperature value in the magnetic recording layer of the magnetic disk or the like, which is measured by the temperature detector 98, based on the control table in the ROM 93. The control table may include data about the relation between the drive current value and the mount of temperature increase by thermal-assist operation in the magnetic recording layer, and data about the temperature independence of the anisotropic field (coercive force) of the magnetic recording layer, as well as the temperature dependences of the oscillation threshold and the characteristics of light output vs. drive current. Thus, it is possible to realize not only a current application to the laser diode 40 linked simply with the recording operation but also more diversified current application modes, by providing the system of the laser ON/OFF signal and drive current control signal independently from the recording/reproducing control signal system.

Obviously, the circuit structure of the recording/reproducing and light-emission control circuit 13 is not limited to that shown in FIG. 9. It is also possible to specify write and read operations by using a signal other than the recording control signal and reproducing control signal.

Practical examples will be described below, in which the generation of near-field light on the near-field light generating end surface of a surface plasmon antenna according to the present invention was analyzed by simulation.

An experiment for the simulation analysis was conducted by using a three-dimensional Finite-Difference Time-Domain (FDTD) method, which is an electromagnetic field analysis technique. The simulation analysis experiment was conducted on a system which was an area including: a head part 221 including a waveguide 35, a buffering portion 50, a surface plasmon antenna 36, a main magnetic pole 3400, and an overcoat layer 38; and an air layer (with a refractive index n=1) covering the head part end surface 2210, shown in FIGS. 4 and 5. Laser light entering the waveguide 35 was a Gaussian beam with a wavelength $\lambda_L$ of 650 nm or 785 nm, having TM polarization (in which the oscillation direction of electric field of the laser light is perpendicular to the layer surface of the waveguide 35, that is, in Z-axis direction). The intensity $I_{IN}$ of the laser light was 632 $(V/m)^2$.

The waveguide 35 had a width $W_{WG2}$ (FIG. 4) of 0.8 μm and a thickness $T_{WG}$ of 0.25 μm, and was formed of $Ta_2O_5$. The $Ta_2O_5$ showed a refractive index n=2.15 at both wavelengths of 650 nm and 785 nm. The surface plasmon antenna 36 had a width $W_{NF}$ (FIG. 4) of 0.85 μm and a thickness $T_{NF}$ of 0.3 μm, and was formed of Ag. The real part of the refractive index of Ag at a wavelength $\lambda_L$ of 650 nm was 0.134, and the imaginary part was 4.135. And the real part of the refractive index of Ag at a wavelength $\lambda_L$ of 785 nm was 0.164 and the imaginary part was 5.115. The distance $D_{BF1}$ (FIG. 4) between the head part end surface 2210 and the position from which the surface plasmon antenna 36 begins to taper was 0.7 μm, and the distance $D_{BF2}$ between the taper-beginning position and the end of the waveguide 35 on the head part end surface 2210 side was 0.5 μm. Here, distance $D_{BF1}$+distance $D_{BF2}$=distance $D_{BF}$ (FIG. 4). The overcoat layer 38 was formed of $Al_2O_3$ (which had a refractive index n=1.65 at both wavelengths $\lambda_L$ of 650 nm and 785 nm), and the buffering portion 50 was a portion of the overcoat layer 38. That is, the refractive index $n_{BF}$ of the buffering portion 50 was 1.65 at both wavelengths $\lambda_L$ of 650 nm and 785 nm. The end surface 3400e of the main magnetic pole 3400 (FIG. 5) had a shape of a trapezoid having a short-edge length of 100 nm on the surface plasmon antenna 36 side, a long-edge length of 195 nm on the opposite side, and a height of 300 nm. The main magnetic pole 3400 was formed of FeCo. The real part of the refractive index of FeCo at a wavelength $\lambda_L$ of 650 nm was 2.87 and the imaginary part was 3.63. The real part of the refractive index of FeCo at a wavelength $\lambda_L$ of 785 nm was 3.08 and the imaginary part was 3.9.

(Relationship Between the Size of Near-Field Light Generating End Surface and the Light-Emitting Position)

Under the experimental conditions described above, the relationship between the height $T_{NF2}$ (FIG. 5) of the triangular near-field light generating end surface 36a of the surface plasmon antenna 36 and the emitting position of near-field light on the near-field light generating end surface 36a was determined by simulation. In the simulation, the apex angle $\theta_{NF}$ of the apex 360a of the near-field light generating end surface 36a was 110 degrees, and the distance $D_{N-P}$ (FIG. 5) between the near-field light generating end surface 36a and the end surface 3400e of the main magnetic pole 3400 on the head part end surface 2210 was 50 nm.

Table 1 shows the result of the determinations by the simulation of the relationship between the height $T_{NF2}$ of the triangle of the near-field light generating end surface 36a and the emitting position of near-field light on the near-field light generating end surface 36a. FIGS. 10a to 10c show schematic views illustrating the emitting positions of near-field light on the head part end surface (opposed-to-medium surface) 2210 shown in Table 1 (and Tables 2 to 4). FIG. 10a shows a case where the emitting position of near-field light is in a "leading side state", and a generating region 1000 is around the apex 360a. FIG. 10b shows a case where the emitting position of near-field light is in an "intermediate state", and generating regions 1001 and 1002 are around the apex 360a and the edge 361a, respectively. FIG. 10c shows a case where the emitting position of near-field light is in a "trailing side state", and a generating region 1003 is around the edge 361a.

TABLE 1

| Wavelength $\lambda_L$ (nm) | Height $T_{NF2}$ (nm) | Emitting position |
| --- | --- | --- |
| 650 | 20 | Trailing side state |
|  | 40 | Intermediate state |
|  | 60 | Leading side state |
|  | 80 | Leading side state |
| 785 | 20 | Trailing side state |
|  | 40 | Intermediate state |
|  | 60 | Leading side state |
|  | 80 | Leading side state |

Referring to Table 1, the emitting position of near-field light on the near-field light generating end surface 36a is in the leading side state or in the intermediate state at height $T_{NF2}$ of 40 nm or greater, regardless of the wavelength $\lambda_L$ of laser light that entered the waveguide 35. This is because the end 360a of the propagation edge 360 to which surface plasmon propagates is located on the leading side (−Z side) on the near-field light generating end surface 36a. On the other hand, at a height $T_{NF2}$ of 20 nm, the emitting position of near-field light is in the trailing side state. This is thought to be because a portion around the apex corresponding to the end 360a (FIG. 5) on the near-field light generating end surface 36a interacts with a portion around the two acute-angle apexes other than the end 360a due to the short distance between them, and the interaction causes the emitting position of near-field light to shift toward the portion around the two apexes. In this case, the emitting position of near-field light becomes closer to the end surface 3400e of the main magnetic pole 3400, and accordingly write field having a sufficiently large gradient can be more reliably applied to a sufficiently heated portion of the magnetic recording layer of a magnetic disk. Therefore, it is understood that the height $T_{NF2}$ is preferably 30 nm or less, and more preferably 20 nm or less.

(Relationship Between the Apex Angle $\theta_{NF}$ of Near-Field Light Generating End Surface and the Light-Emitting Position)

Then, the relationship between the apex angle $\theta_{NF}$ of the apex 360a of the triangular near-field light generating end surface 36a of the surface plasmon antenna 36 (FIG. 5 and FIGS. 10a to 10c) and the emitting position of near-field light on the near-field light generating end surface 36a was determined by simulation under the experimental conditions described above. In the simulation, the height $T_{NF2}$ of the near-field light generating end surface 36a was 20 nm, and the distance $D_{N-P}$ (FIG. 5) between the near-field light generating end surface 36a and the end surface 3400e of the main magnetic pole 3400 was 50 nm.

Table 2 shows the result of the determinations by the simulation of the relationship between the apex angle $\theta_{NF}$ of the triangle of the near-field light generating end surface 36a and the emitting position of near-field light on the near-field light generating end surface 360.

TABLE 2

| Wavelength $\lambda_L$ (nm) | Apex angle $\theta_{NF}$ (degree) | Emitting position |
| --- | --- | --- |
| 650 | 80 | Trailing side state |
|  | 110 | Trailing side state |

It is understood from Table 2 that when the apex angle $\theta_{NF}$ is greater than or equal to 80 degrees and less than and equal to 110 degrees, the emitting position of near-field light on the near-field light generating end surface 36a is in the trailing side state and becomes closer to the end surface 3400a of the main magnetic pole 3400. In this case, write field having a sufficiently large gradient can be more reliably applied to a sufficiently heated portion of the magnetic recording layer of a magnetic disk.

(Spacing $D_{N-P}$ Between the Near-Field Light Generating End Surface and the Main Magnetic Pole End Surface)

Then, the relationship between: the distance $D_{N-P}$ (FIG. 5 and FIGS. 10a to 10c) from the near-field light generating end surface 36a of the surface plasmon antenna 36 to the end surface 3400e of the main magnetic pole 3400 on the head part end surface 2210; and the near-field light emitting position on the near-field light generating end surface 36a was determined by simulation. In the simulation, the height $T_{NF2}$ of the near-field light generating end surface 36a was 20 nm and the apex angle $\theta_{NF}$ was 110 degrees.

Table 3 shows the result of the determinations by the simulation of the relationship between the distance $D_{N-P}$ and the emitting position of near-field light on the near-field light generating end surface 36a.

TABLE 3

| Wavelength $\lambda_L$ (nm) | Spacing $D_{N-P}$ (nm) | Emitting position |
| --- | --- | --- |
| 650 | 10 | Intermediate state |
|  | 30 | Trailing side state |
|  | 50 | Trailing side state |
|  | 90 | Trailing side state |

Referring to Table 3, when the distance $D_{N-P}$ is as small as 10 nm, the emitting position of near-field light on the near-field light generating end surface 36a is in the intermediate state. This is thought to be because the emitting position, which would otherwise be in the trailing side state, was shifted toward the leading side due to the absorption of a part of generated near-field light into the main magnetic pole 3400. On the other hand, when the distance $D_{N-P}$ is 30 nm or more, the emitting position of near-field light is in the trailing side state, and becomes closer to the end surface 3400e of the main magnetic pole 3400. In this case, write field having a sufficiently large gradient can be more reliably applied to a sufficiently heated portion of the magnetic recording layer of a magnetic disk. Therefore, it is understood that the distance $D_{N-P}$ is preferably at least 20 nm, more preferably at least 30 nm.

(Straight Propagation Edge)

The emitting position of near-field light on a near-field light generating end surface 83a in a system including a waveguide 35, a surface plasmon antenna 83, and a main magnetic pole 820 shown in FIG. 8b was determined by simulation. Table 4 shows the result of the determinations by the simulation. The experimental conditions of the simulation were the same as the experimental conditions described above except that the surface plasmon antenna 83 and the main magnetic pole 820 were used in place of the surface plasmon antenna 36 and the main magnetic pole 3400. The height $T_{NF2}$ and the apex angle $\theta_{NF}$ of the near-field light generating end surface 83a are shown in FIG. 8b. The distance $D_{N-P}$ between the near-field light generating end surface 83a and the end surface 82e of the main magnetic pole 820 on the head part end surface 2210 (FIG. 8b) was 50 nm.

TABLE 4

| Wavelength $\lambda_L$ (nm) | $T_{NF}$ (nm) | Apex angle $\theta_{NF}$ (degree) | Emitting position |
|---|---|---|---|
| 650 | 20 | 110 | Trailing side state |

It can be seen from Table 4 that, in the system in which the surface plasmon antenna 83 having the propagation edge 830 straightly extending is combined with the main magnetic pole 820 having the portion on the head part end surface 2210 side that is inclined toward the surface plasmon antenna 83, the emitting position of near-field light is in the trailing side state, and becomes closer to the end surface 82e of the main magnetic pole 820. Accordingly, write field having a sufficiently large gradient can be more reliably applied to a sufficiently heated portion of the magnetic recording layer of a magnetic disk.

As described above, it is understood that a surface plasmon antenna is provided, which can be set so that the emitting position on the end surface of the surface plasmon antenna where near-field light is emitted is located sufficiently close to the end of a magnetic pole. Further, it is also understood that provided is a thermal-assisted magnetic recording head capable of appropriately heating the write position on the magnetic recording medium. Thus, the present invention can achieve better thermal-assisted magnetic recording, and contribute to the achievement of higher recording density, for example, exceeding 1 Tbits/in².

All the foregoing embodiments are by way of example of the present invention only and not intended to be limiting, and many widely different alternations and modifications of the present invention may be constructed without departing from the spirit and scope of the present invention. Especially, the near-field light generating element utilizing the surface plasmon mode according to the present invention can be applied to optical devices with greatly minute optical paths such as ultra-high-speed light modulation devices. Accordingly, the present invention is limited only as defined in the following claims and equivalents thereto.

The invention claimed is:

1. A near-field light generating element comprising:
a waveguide through which a light for exciting surface plasmon propagates; and
a plasmon antenna comprising (a) an edge having a coupling portion for coupling with the light in a surface plasmon mode, the coupling portion being opposed to a portion of a side surface of said waveguide with a predetermined spacing, and (b) a near-field light generating end surface located close to an end surface of a main magnetic pole, said near-field light generating end surface configured to emit near-field light outside the element,
said edge being provided for propagating surface plasmon excited by the light, and extending from the coupling portion to said near-field light generating end surface that emits near-field light by receiving the propagated surface plasmon.

2. The near-field light generating element as claimed in claim 1, wherein at least a portion of said edge extends so as to become closer to an end surface of said plasmon antenna toward said near-field light generating end surface, said end surface being on a side opposite to said edge.

3. The near-field light generating element as claimed in claim 2, wherein a portion of said edge near said near-field light generating end surface extends parallel to the end surface opposite to said edge of said plasmon antenna.

4. The near-field light generating element as claimed in claim 1, wherein said near-field light generating end surface of said plasmon antenna has a triangular shape in which one apex is an end of said edge.

5. The near-field light generating element as claimed in claim 4, wherein an emitting position of near-field light on said near-field light generating end surface is on an opposite side to said apex as the end of said edge.

6. The near-field light generating element as claimed in claim 5, wherein said near-field light generating end surface has a triangular shape with a height of 30 nanometers or less.

7. The near-field light generating element as claimed in claim 1, wherein said near-field light generating end surface of said plasmon antenna has a shape of a rhombus in which one apex is an end of said edge.

8. The near-field light generating element as claimed in claim 1, wherein said plasmon antenna is formed of one element selected from a group of Pd, Pt, Rh, Ir, Ru, Au, Ag, Cu or Al, or an alloy made of at least two selected from frons the group.

9. The near-field light generating element as claimed in claim 1, wherein a portion sandwiched between the portion of the side surface of said waveguide and the portion of said edge, which are opposed to each other, is a buffering portion having a refractive index lower than a refractive index of said waveguide.

10. A thermal-assisted magnetic recording head comprising:
a magnetic pole for generating write field from its end on an opposed-to-medium surface side;
a waveguide through which a light for exciting surface plasmon propagates; and
a plasmon antenna comprising (a) an edge having a coupling portion for coupling with the light in a surface plasmon mode, the coupling portion being opposed to a portion of a side surface of said waveguide with a predetermined spacing, and (b) a near-field light generating, end surface positioned close to an end surface of said magnetic pole, and reaching an opposed-to-medium surface of the head, said near-field light generating end surface configured to emit near-field light outside the recording head,
said edge being provided for propagating surface plasmon excited by the light, and extending from the coupling portion to said near-field light generating end surface that emits near-field light by receiving the propagated surface plasmon.

11. The thermal-assisted magnetic recording head as claimed in claim 10, wherein said waveguide is provided in a side opposite to said magnetic pole in relation to said plasmon antenna.

12. The thermal-assisted magnetic recording head as claimed in claim 11, wherein a portion on the opposed-to-medium surface side of said plasmon antenna is inclined so as to become closer to an end portion on the opposed-to-medium surface side of said magnetic pole toward the opposed-to-medium surface.

13. The thermal-assisted magnetic recording head as claimed in claim 11, wherein a portion on the opposed-to-medium surface side of said magnetic pole is inclined so as to become closer to an end portion on the opposed-to-medium surface side of said plasmon antenna toward the opposed-to-medium surface.

14. The thermal-assisted magnetic recording head as claimed in claim 13, wherein a portion on the opposed-to-medium surface side of an end surface of said plasmon antenna, the end surface being on a side opposite to said edge, is inclined so as to become closer to said edge toward the opposed-to-medium surface.

15. The thermal-assisted magnetic recording head as claimed in claim 10, wherein a portion sandwiched between the portion of the side surface of said waveguide and the portion of said edge, which are opposed to each other, is a buffering portion having a refractive index lower than a refractive index of said waveguide.

16. The thermal-assisted magnetic recording head as claimed in claim 15, wherein said buffering portion is a portion of an overcoat layer formed so as to cover said waveguide.

17. The thermal-assisted magnetic recording head as claimed in claim 10, wherein said edge is covered with a material having a refractive index higher than a refractive index of a material covering an end surface of said plasmon antenna, said end surface being on a side opposite to said edge.

18. The thermal-assisted magnetic recording head as claimed in claim 17, wherein a thermal conduction layer is provided between said plasmon antenna and said magnetic pole, so as to cover the end surface opposite to said edge of said plasmon antenna.

19. The thermal-assisted magnetic recording head as claimed in claim 10, wherein a distance between said near-field light generating end surface of said plasmon antenna and an end surface of said magnetic pole on the opposed-to-medium surface is at least 20 nanometers.

20. A head gimbal assembly comprising: a thermal-assisted magnetic recording head as claimed in claim 10; and a suspension supporting said thermal-assisted magnetic recording head.

21. A near-field light generating element comprising:
a waveguide through which a light for exciting surface plasmon propagates; and
a plasmon antenna comprising (a) an edge having a coupling portion for coupling with the light in a surface plasmon mode, the coupling portion being opposed to a portion of a side surface of said waveguide with a predetermined spacing, and (b) a near-field light generating end surface positioned close to an end surface of a main magnetic pole, said near-field light generating end surface configured to emit near-field light outside the element,
said edge being provided for propagating surface plasmon excited by the light, and extending from the coupling portion to said near-field light generating end surface that emits near-field light and by receiving the propagated surface plasmon, and
an emitting position of near-field light on said near-field light generating end surface being on an opposite side to said waveguide.

22. The near-field light generating element as claimed in claim 21, wherein said near-field light generating end surface of said plasmon antenna has a triangular shape in which one apex is an end of said edge.

23. A thermal-assisted magnetic recording head comprising:
a magnetic pole for generating write field from its end on an opposed-to-medium surface side:
a waveguide through which a light for exciting surface plasmon propagates; and
a plasmon antenna comprising (a) an edge having a coupling portion for coupling with the light in a surface plasmon mode, the coupling portion being opposed to a portion of a side surface of said waveguide with a predetermined spacing, and (b) a near-field light generating, end surface positioned close to an end surface of said magnetic pole, and reaching an opposed-to-medium surface of the head, said near-field light generating end surface configured to emit near-field light outside the recording head,
said edge being provided for propagating surface plasmon excited by the light, and extending from the coupling portion to said near-field light generating end surface that emits near-field light by receiving the propagated surface plasmon;
an emitting position of near-field light on said near-field light generating end surface being on an opposite side to said waveguide.

24. The thermal-assisted magnetic recording head as claimed in claim 23, wherein said near-field light generating end surface of said plasmon antenna has a triangular shape in which one apex is an end of said edge.

25. A magnetic recording apparatus comprising:
at least one head gimbal assembly as claimed in claim 20;
at least one magnetic recording medium; and
a recording and light-emission control circuit for controlling write operations which said thermal-assisted magnetic recording head performs to said at least one magnetic recording medium and for controlling operations of a light source that generates the light for exciting surface plasmon.

* * * * *